US009962629B2

(12) United States Patent
Taylor et al.

(10) Patent No.: US 9,962,629 B2
(45) Date of Patent: May 8, 2018

(54) CONTACTORS, CARTRIDGES, COMPONENTS, SYSTEMS, AND RELATED METHODS

(75) Inventors: Gareth P. Taylor, Indian Trail, NC (US); Elmer Wayne Bouldin, Jr., Fort Mill, SC (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 13/697,799

(22) PCT Filed: Sep. 12, 2012

(86) PCT No.: PCT/US2012/054758
§ 371 (c)(1),
(2), (4) Date: Nov. 14, 2012

(87) PCT Pub. No.: WO2013/039971
PCT Pub. Date: Mar. 21, 2013

(65) Prior Publication Data
US 2014/0216258 A1  Aug. 7, 2014

Related U.S. Application Data

(60) Provisional application No. 61/533,434, filed on Sep. 12, 2011.

(51) Int. Cl.
*B01D 19/00* (2006.01)
*B01D 61/00* (2006.01)
(Continued)

(52) U.S. Cl.
CPC ......... *B01D 19/00* (2013.01); *B01D 19/0031* (2013.01); *B01D 61/00* (2013.01);
(Continued)

(58) Field of Classification Search
CPC .. B01D 29/48; B01D 29/022; B01D 29/0025; B01D 29/0047; B01D 29/0052;
(Continued)

(56) References Cited

U.S. PATENT DOCUMENTS 3,363,680 A    1/1968 Baker et al.
4,016,083 A *  4/1977 Sakaguchi et al. ...... 210/321.83
(Continued)

FOREIGN PATENT DOCUMENTS

EP    0 226 431       6/1987
EP    1582252 A1     5/2005
(Continued)

*Primary Examiner* — Pranav N Patel
(74) *Attorney, Agent, or Firm* — Scott A. Baum

(57) ABSTRACT

The instant application relates to a high pressure spiral-type hollow fiber membrane fabric-containing module or contactor, comprising: a high pressure module housing or vessel; a pair of end caps; liquid end ports and at least one gas port; and at least one membrane cartridge, wherein each module or contactor has one or more shims, spacers, protrusions, and/or the like on a cartridge shell exterior, on a module housing interior, on the cartridge shell exterior and on the module housing interior, and/or between the shell and the housing.

34 Claims, 9 Drawing Sheets

(51) Int. Cl.
  *B01D 63/02* (2006.01)
  *B01D 63/04* (2006.01)
(52) U.S. Cl.
  CPC ......... *B01D 63/025* (2013.01); *B01D 63/043* (2013.01); *B01D 2313/02* (2013.01); *B01D 2313/20* (2013.01); *Y10T 29/49826* (2015.01)
(58) Field of Classification Search
  CPC .... B01D 29/016; B01D 29/031; B01D 29/07; B01D 29/073; B01D 29/21; B01D 29/232; B01D 29/333; B01D 29/353; B01D 63/10; B01D 63/103; B01D 63/106; B01D 63/12; B01D 63/046; B01D 63/06; B01D 61/02; B01D 61/08; B01D 61/14; B01D 61/18; B01D 2201/295; B01D 2201/296; B01D 2201/304; B01D 2201/34; B01D 2201/342; B01D 2201/345; B01D 2201/347; B01D 2313/02; B01D 2313/04; B01D 2313/06
  See application file for complete search history.

(56) References Cited

U.S. PATENT DOCUMENTS

| | | | |
|---|---|---|---|
| 4,750,525 A * | 6/1988 | Vaughan | B01D 63/06 138/109 |
| 4,793,932 A | 12/1988 | Ford et al. | |
| 5,013,437 A | 5/1991 | Trimmer et al. | |
| 5,096,584 A * | 3/1992 | Reddy et al. | 210/321.74 |
| 5,108,604 A | 4/1992 | Robbins | |
| 5,185,019 A * | 2/1993 | Haldipur | B01D 46/0005 55/378 |
| 5,264,171 A | 11/1993 | Prasad et al. | |
| 5,352,361 A | 10/1994 | Prasad et al. | |
| 5,897,729 A | 4/1999 | Bikson et al. | |
| 5,938,922 A | 8/1999 | Fulk, Jr. et al. | |
| 6,299,772 B1 * | 10/2001 | Huschke et al. | 210/282 |
| 6,302,448 B1 * | 10/2001 | Van Der Meer et al. | 285/123.15 |
| 2004/0262789 A1 | 12/2004 | Boye | |
| 2005/0029192 A1 * | 2/2005 | Arnold et al. | 210/641 |
| 2005/0035047 A1 * | 2/2005 | Colby et al. | 210/321.74 |
| 2006/0131235 A1 * | 6/2006 | Offeman et al. | 210/640 |
| 2008/0128348 A1 | 6/2008 | Blum | |
| 2009/0020008 A1 * | 1/2009 | Wynn | 95/45 |
| 2009/0126436 A1 | 5/2009 | Fly et al. | |
| 2010/0068603 A1 * | 3/2010 | Kanazawa | B01D 63/02 429/423 |
| 2010/0147761 A1 * | 6/2010 | McCollam | 210/450 |
| 2011/0000844 A1 * | 1/2011 | Uda et al. | 210/335 |
| 2011/0036240 A1 | 2/2011 | Taylor et al. | |
| 2011/0042294 A1 * | 2/2011 | Bonta et al. | 210/232 |
| 2011/0100499 A1 | 5/2011 | Saltel et al. | |

FOREIGN PATENT DOCUMENTS

| | | |
|---|---|---|
| EP | 1261411 B1 | 11/2012 |
| JP | S48-028383 A | 4/1973 |
| JP | S54-131575 A | 10/1979 |
| JP | S55-037202 Y2 | 9/1980 |
| JP | 1994 (H06) 226057 | 8/1994 |
| JP | 2009-202112 A | 9/2009 |
| WO | WO 01/66231 A1 | 9/2001 |
| WO | WO 03/039708 A1 | 5/2003 |

* cited by examiner

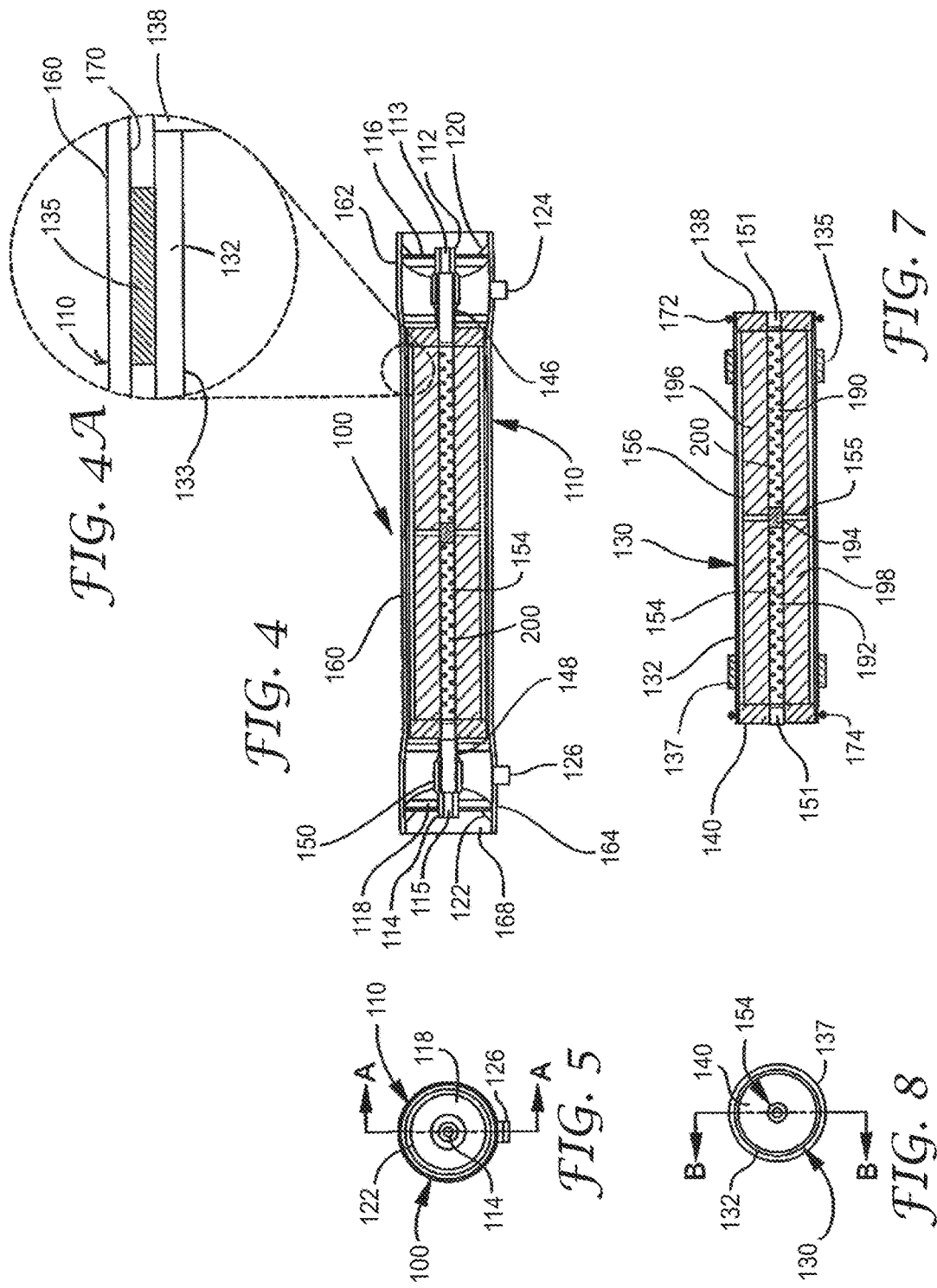

CONTACTORS, CARTRIDGES, COMPONENTS, SYSTEMS, AND RELATED METHODS

CROSS-REFERENCE TO RELATED APPLICATIONS

The present application claims priority to and the benefit of U.S. provisional patent application Ser. No. 61/533,434 filed Sep. 12, 2011, which is hereby fully incorporated by reference herein.

FIELD OF INVENTION

The instant application relates to new or improved membrane contactors, modules, cartridges, components (including shells, housings, shims, spacers, and/or the like), systems, their methods of manufacture and/or use, and/or means and/or methods of enhancing the robustness, operation pressures, cycle life, and/or the like of such membrane contactors, cartridges, components, and systems. In at least selected embodiments, the present invention is directed to new or improved high pressure liquid degassing membrane contactors, cartridges, components, systems, and/or their methods of manufacture and/or use, and/or means and/or methods of enhancing the robustness, operation pressures, cycle life, and the like of such membrane contactors, cartridges, components, and systems. In at least certain embodiments, the present invention is directed to new or improved apparatus for and/or methods of degassing a high pressure liquid having entrained or dissolved gases with a new or improved hollow fiber membrane contactor, cartridge, component, and/or system. In at least particular possibly preferred embodiments, the new or improved contactor has a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing.

BACKGROUND OF THE INVENTION

A membrane contactor or module may be used for many purposes, including but not limited to, removing entrained gases from liquids, debubbling liquids, filtering liquids, and/or adding a gas to a liquid. Membrane contactors are known to be used in many different applications, for example, a membrane contactor may be used in removing entrained gases from inks used in printing.

Membrane contactors may also provide a means of accomplishing fluid separations, such as gas/gas, gas/liquid, and liquid/liquid (which can encompass liquid/dissolved solid) separations. Membrane contactors typically are used to bring two immiscible fluid phases—for example, a first liquid and a second liquid, or a gas and a liquid—into contact with one another to effect separation and/or transfer of one or more components from one fluid to the other.

A hollow fiber membrane contactor typically includes a bundle of microporous hollow fibers, and a rigid shell or housing enclosing the fiber bundle. The shell may be provided with four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into common first and second end cap portions of the shell. In a "tube-side" or "lumen-side" contactor, the first end cap may contain the inlet for the first fluid, which is designated the "tube-side" or "lumen-side" fluid because it is the fluid that passes through the internal lumens of the fibers. The second end cap may contain the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers, flows through the interstices between fibers of the fiber bundle, and may be directed to flow parallel or perpendicular to the fiber length. As an example, U.S. Pat. No. 5,352,361 to Prasad, et al., incorporated by reference herein in its entirety, may assist in a background understanding of fluid contact across hollow fiber membranes within a shell.

In a "shell-side" contactor, the contactor may include a central core which passes through the end caps and has a first end serving as the inlet for the first fluid, which is designated the "shell-side" fluid because it is the fluid that passes over the exterior or shell of the hollow fibers. The first end cap may contain the inlet for the second fluid, which is designated the "tube-side" or "lumen-side" fluid because it is the fluid that passes through the internal lumens of the fibers. The second end cap may contain the outlet for discharging the lumen-side fluid. The first fluid, designated the "shell-side" fluid, typically enters and exits the housing through inlet and outlet ports (open ends) of a perforated core, and typically exits and re-enters the perforations in the core between the tube sheets whereby the shell-side fluid contacts the external surfaces of the fibers. The shell-side fluid flows through the interstices between fibers of the fiber bundle, and may be directed to flow parallel or perpendicular to the fiber length.

Because the tube sheets separate the lumen-side fluid from the shell-side fluid, the lumen-side fluid does not mix with the shell-side fluid, and the only transfer between the lumen-side fluid and the shell-side fluid occurs through the walls of the hollow fibers. The fine pores in the fiber wall are normally filled with a stationary layer of one of the two fluids, the other fluid being excluded from the pores due to surface tension and/or pressure differential effects. Mass transfer and separation are usually caused by diffusion, which is driven by the difference in concentration or pressure of the transferring species between the two phases. Typically, no convective or bulk flow occurs across the membrane.

In the case of gas/liquid separations, membrane contactors are typically fabricated with hydrophobic hollow fiber microporous membranes. Since the membranes are hydrophobic and have very small pores, liquid will not easily pass through the pores. The membranes act as an inert support that brings the liquid and gas phases into direct contact, without dispersion. The mass transfer between the two phases is governed by the difference in partial pressure of the gas species being transferred.

For liquid systems, the liquid/liquid interface at each pore is typically immobilized by the appropriate selection of membrane and liquid phase pressures. In this case, the membrane also acts as an inert support to facilitate direct contacting of two immiscible phases without mixing.

Such known membrane contactors can be utilized for a variety of applications, including the separation of a component from a fluid or transferring a component of one fluid to another. For example, a membrane contactor can be used in removal of contaminants from an effluent stream. In many industrial processes, a contaminated effluent stream is generated as a by-product. In view of environmental concerns, and/or efforts to improve process efficiency, it is often desirable to remove one or more contaminants from the effluent stream so that the contaminant does not pollute the environment, does not harm equipment, or so that it may be recycled. Existing industrial processes frequently must be upgraded to reduce environmental emissions and/or increase efficiency. Therefore, a need often arises for a process and system that can be economically retrofit to an existing plant or process to reduce emissions, protect equipment, recycle, and/or improve efficiency.

Several factors may be important in the design of membrane contactors, including separation characteristics, cost, pressure drop, weight, and efficiency. The pressure drop across a contactor should be low to reduce the need for more expensive high pressure equipment. Low pressure drop is of particular importance in retrofit projects where a membrane contactor is to be added at the discharge point of an effluent process stream, as the process pressure at this point is typically at or near atmospheric pressure. High efficiency of mass transfer is desirable for reducing the size of the contactor. Low weight is desirable for decreasing installation and maintenance costs, and is of particular importance in offshore applications. At least certain existing membrane contactors have been found less than fully satisfactory in meeting these goals, for particular applications, for extreme conditions, or the like. For example, the shell portion of typical membrane contactors adds considerably to their weight and expense. Shell-type contactors also typically must operate at elevated pressures.

Baffled membrane contactors capable of separating fluids are known, for example, see U.S. Pat. Nos. 5,264,171; 5,352,361; and 5,938,922, each of which is incorporated herein by reference in its entirety. At least certain of such contactors may include a perforated center tube, a plurality of hollow fibers surrounding the tube, tube sheets affixing the ends of the hollow fibers, a baffle located between the tube sheets, and a shell surrounding the tube, fibers, tube sheets, and baffle. Other than as disclosed in the U.S. Pat. No. 5,938,922 patent, the fibers are usually open at the baffle so that there is fluid communication through the hollow fiber lumen from one tube sheet to the other. U.S. Pat. No. 5,938,922 discloses having the fibers closed at the baffle to prevent fluid communication through the hollow fiber lumen near the midpoint of the fibers between the tube sheets.

Such contactors capable of separating fluids, for example, dissolved gas from water, have numerous industrial applications. Those applications include: rust prevention systems for boilers or power plant turbines; rust prevention systems for drinking water, cooling water, or hot water pipe lines; ultra-pure water sources for the electronics industry (e.g., rinsing semiconductor wafers during manufacture); ultrasonic cleaning processes; water sources for food processing; and the like.

Two of the foregoing applications are of particular interest. They are rust prevention in water pipe lines and ultra-pure water sources for the electronics industry. In each application, the removal of dissolved oxygen from water is extremely important. In water pipe lines, the oxygen reacts with dissolved iron or iron from the pipe line to form rust that may precipitate. In potable water, the rust precipitate is unattractive and causes staining; and in pipe lines, it can cause occlusion of the pipe. In the electronics industry, ultra-pure water is used to rinse semiconductor wafers during manufacture. Dissolved oxygen in the rinse water can etch the surface of the wafer and destroy it; it can also coat the wafer surface and prevent effective rinsing. Accordingly, the removal of dissolved gasses from water is extremely important.

Also, current designs of most membrane contactors are effective for some applications, but may have certain issues or limitations related to, for example, the degassing of high flow rate liquids and/or high pressure liquids, such as seawater at about 50 gpm or more and/or about 300 psi or more, high pressure ratings, ASME code ratings, customer familiarity and acceptance, high cost, high weight, use of metal or other corrosive materials, modularity, replaceable self contained cartridges, porting options, module size, module array size, high pressure cartridges, excessively long fibers, liquid flow rates, gas concentration variation, do not allow for commercial production, low cycle life, low pressure rating, cartridge failure, and/or the like.

High flow rate, high pressure membrane contactors have long been the subject of interest to membrane contactor developers. For example, selected gas transfer membrane contactors developed and manufactured by the Liqui-Cel business of Membrana-Charlotte a division of Celgard, LLC of Charlotte, N.C. can handle high flow rate (up to 400 gpm) and high pressure (up to 300 psi) liquids.

With the exception of the recent use of, for example, Liqui-Cel® Extra-Flow™ membrane contactor systems and Liqui-Cel® 8×80-inch high pressure membrane contactor systems, most large scale industrial degasification systems still utilize very large vacuum towers to degasify water, seawater, and the like. For example, power plants and offshore oil rigs typically use large vacuum towers (30 feet tall or more) to degass water, process water, storage tank water, seawater, salt water, or the like. The unique Liqui-Cel® 8×80-inch high pressure membrane contactors were developed and manufactured by the Liqui-Cel business of Membrana-Charlotte a division of Celgard, LLC of Charlotte, N.C. and are described and shown as at least one embodiment in U.S. published patent application 2011/0036240 A1, published Feb. 17, 2011, based on U.S. patent application Ser. No. 12/857,199 filed Aug. 16, 2010, to Taylor et al., entitled "High Pressure Liquid Degassing Membrane Contactors and Methods of Manufacturing and Use", which is hereby fully incorporated by reference herein. In at least selected embodiments, the high pressure membrane contactors of U.S. published application 2011/0036240 A1 have a high pressure vessel or housing enclosing at least one membrane cartridge including a perforated core, a plurality of hollow fiber membranes, a tube sheet affixing each end of the hollow fibers, and a shell or casing.

A need still exists for new or improved membrane contactors having improved characteristics over known membrane contactors, for use in particular applications, for use in extreme conditions, or the like. Also, there exists a need to develop new or improved contactors and systems for the degassing of liquids. Further, a need exists for an improved microporous hollow fiber membrane device and/or method having improved characteristics over known membrane contactors, methods, or the like. Yet further, there exists a need for a new or improved liquid degassing membrane contactor that may allow for relatively small, modular, degassing modules to be used in industrial processes, at power plants, on offshore oil rigs or drilling platforms, to replace or augment vacuum towers, to provide the benefits of modularity and replaceable cartridges, and/or the like. Still further, there is a need for a new or improved liquid degassing membrane contactor and methods of manufacture and/or use thereof, a new or improved high pressure liquid degassing membrane contactor and/or methods of manufacture and/or use thereof, a new or improved high pressure liquid degassing system, and/or the like. And even still yet further, there is a need for new or improved membrane contactors, cartridges, components, systems, their methods of manufacture and/or use, and/or means and/or methods of enhancing the robustness, operation pressures, cycle life, and the like of such membrane contactors, cartridges, components, and systems, new or improved high pressure liquid degassing membrane contactors, cartridges, components, systems, and/or their methods of manufacture and/or use, and/or means and/or methods of enhancing the robustness, operation pressures, cycle life, and the like of such membrane contactors, cartridges, components, and systems, new or improved apparatus for and/or methods of degassing a high pressure liquid having entrained or dissolved gases with an improved hollow fiber membrane contactor, cartridge, component, and/or system, and/or new or improved contactors having a high pressure vessel or housing enclosing at least one improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing.

SUMMARY OF THE INVENTION

It is to the provision of such new or improved membrane contactors, modules, cartridges, components (including shells, housings, shims, spacers, and/or the like), systems, their methods of manufacture and/or use, and/or means and/or methods of enhancing the robustness, operation pressures, cycle life, and/or the like of such membrane contactors, cartridges, components, and systems, and/or contactors and systems for the degassing of liquids, liquid degassing membrane contactors, degassing modules, replaceable cartridges, liquid degassing membrane contactors and methods of manufacture and/or use thereof, high pressure liquid degassing membrane contactors and/or methods of manufacture and/or use thereof, high pressure liquid degassing systems, cartridges, components, systems, their methods of manufacture and/or use, and/or means and/or methods of enhancing the robustness, operation pressures, cycle life, and the like of such membrane contactors, cartridges, components, and systems, apparatus for and/or methods of degassing a high pressure liquid having entrained or dissolved gases with a new or improved hollow fiber membrane contactor, cartridge, component, and/or system, contactors having a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing, microporous hollow fiber membrane devices and/or methods, and/or the like addressing or meeting the above needs and/or other needs that at least selected embodiments of the present invention may be directed.

At least selected embodiments of the present invention at least address the need for new or improved membrane contactors, cartridges, components, systems, their methods of manufacture and/or use, and/or means and/or methods of enhancing the robustness, operation pressures, cycle life, and the like of such membrane contactors, cartridges, components, and systems, new or improved high pressure liquid degassing membrane contactors, cartridges, components, systems, and/or their methods of manufacture and/or use, and/or means and/or methods of enhancing the robustness, operation pressures, cycle life, and the like of such membrane contactors, cartridges, components, and systems, new or improved apparatus for and/or methods of degassing a high pressure liquid having entrained or dissolved gases with an improved hollow fiber membrane contactor, cartridge, component, and/or system, new or improved contactors having a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing, and/or the like.

At least selected embodiments or aspects of the present invention are directed to new or improved membrane contactors, cartridges, components (including shells, housings, shims, spacers, and/or the like), systems, their methods of manufacture and/or use, and/or means and/or methods of enhancing the robustness, operation pressures, cycle life, and the like of such membrane contactors, cartridges, components, and systems. In at least selected embodiments, the present invention is directed to new or improved high pressure liquid degassing membrane contactors, cartridges, components, systems, and/or their methods of manufacture and/or use, and/or means and/or methods of enhancing the robustness, operation pressures, cycle life, and the like of such membrane contactors, cartridges, components, and systems. In at least certain embodiments, the present invention is directed to new or improved apparatus for and/or methods of degassing a high pressure liquid having entrained or dissolved gases with a new or improved hollow fiber membrane contactor, cartridge, component, and/or system. In at least particular possibly preferred embodiments, the new or improved contactor has a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing, and/or the like.

At least certain embodiments or objects of the present invention at least address the need for an improved membrane contactor having improved characteristics over known membrane contactors, for use in particular applications, for use in extreme conditions, or the like, for improved microporous hollow fiber membrane devices and/or methods, and/or the like.

At least certain embodiments or objects of the present invention at least address the need for an improved membrane contactor having an improved cartridge therein for use in particular applications, for use in extreme conditions, or the like.

At least certain possibly preferred embodiments of the present invention are directed to new or improved membrane contactors, cartridges, shells, systems, their methods of manufacture and/or use, and/or means and/or methods of enhancing the robustness, operation pressures, cycle life, and the like of such membrane contactors, cartridges, shells, and systems, new or improved high pressure liquid degassing membrane contactors, cartridges, shells, systems, and/or their methods of manufacture and/or use, and/or means and/or methods of enhancing the robustness, operation pressures, cycle life, and the like of such membrane contactors, cartridges, and systems, new or improved apparatus for and/or methods of degassing a high pressure liquid having entrained or dissolved gases with an improved hollow fiber membrane contactor, cartridge, shell, and/or system, new or improved contactors having a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, and/or the like.

At least selected embodiments of the present invention at least address the need for improved membrane contactors, cartridges, shells, components, systems, their methods of manufacture and use, and methods of enhancing the robustness, operation pressures, cycle life, and the like of such membrane contactors, cartridges, shells, components, and systems, improved high pressure liquid degassing membrane contactors, membrane contactors, cartridges, shells, components, systems, and/or their methods of manufacture and/or use, improved methods of degassing high pressure liquids having entrained or dissolved gases with improved hollow fiber membrane contactors, improved contactors having a high pressure vessel or housing enclosing at least one improved membrane cartridge including a perforated core, a plurality of hollow fiber membranes, a tube sheet affixing each end of the hollow fibers, a shell or casing, and one or more shims, spacers, protrusions, or the like on the shell, on the housing, on the shell and on the housing, and/or between the shell and the housing, and/or the like. In accordance with at least one aspect of the present invention, it was discovered that certain hollow fiber cartridges for certain high pressure contactors were experiencing epoxy delamination due to a high stress concentration at the epoxy/shell interface when high pressure was applied to the contactor (see FIG. 1). This elevated stress concentration was caused by the cartridge shell expanding until it reached the interior surface of the high pressure housing (for example, the gap between the exterior of the cartridge and the interior of the RO vessel was sufficient to allow the cartridge shell to expand outwardly and stress the epoxy/shell interface).

In accordance with at least one embodiment of the present invention, it was discovered that by adding a shim, spacer, member, pad, ring, strip, protrusion, or the like to the exterior of the cartridge shell a given distance from the epoxy/shell interface (such as a winding of polyethylene (PE) tape of a given thickness, for example, ~0.005" to 0.060", a given distance from the epoxy/shell interface, for example, ~0.1" to 0.5") it was possible to shift the peak stress concentration away from the epoxy/shell interface and thereby avoid the epoxy delamination at the epoxy/shell interface when high pressure was applied to the contactor (see FIG. 2). The cartridge shell is strong enough to support the higher stress in this new location. A possibly preferred PE tape has a thickness of about 0.005"-0.015" and a width of about 1.5"-3.0". In accordance with a particular example, a possibly preferred shim is formed near each end of the cartridge shell using a PE tape that is about 2" wide and about 0.0065" thick and the shell is wrapped twice near each end (using approximately 50.24" of tape per 8" diameter cartridge shell end).

Other shim or spacer options can be used instead of PE tape. For example, other tape materials such as Teflon, Nylon, polypropylene (PP), and other thermoplastics could be used. Also, a thin shim material could be wrapped around the cartridge without the use of tape. Materials such as plastics, metals, or paper could be used. The shims do not need to be a continuous wrap. Shims placed intermittently around the cartridge shell perimeter can also be used. The shims or spacers can be added to the cartridge shell (adhered, glued, welded, or otherwise held in place), can be part of the shell (integral members, machined, cast, molded, or otherwise formed), or both. Further, the shim or spacer can be on the cartridge, on the housing, on both the cartridge and housing, and/or between the cartridge and housing. For at least certain possibly preferred embodiments, it is preferred that the shims or spacers be added to the cartridge shell exterior or formed as part of the cartridge shell (as it may be more difficult, costly or less advantageous to add shims or spacers to the interior of the contactor housing, for ease of manufacturing, for use of off the shelf RO pressure vessels, and/or the like).

In accordance with at least one particular embodiment of the present invention, it was discovered that the shim is ideally located in a position that is in the same proximity as the point of contact between the shell and housing with no shim.

In accordance with at least selected embodiments of the present invention, the addition of shims, spacers, members, pads, rings, strips, windings, protrusions, members, or the like to the exterior of the cartridge shell a given distance inward from the epoxy/shell interface at least near each end of the cartridge prior to insertion of the cartridge into the contactor housing reduces or eliminates epoxy delamination at the epoxy/shell interface, and/or provides new or improved cartridges, membrane contactors, contactors and systems for the degassing of liquids, liquid degassing membrane contactors, degassing modules, replaceable cartridges, liquid degassing membrane contactors and methods of manufacture and/or use thereof, high pressure liquid degassing membrane contactors and/or methods of manufacture and/or use thereof, high pressure liquid degassing systems, cartridges, shells, components, systems, their methods of manufacture and/or use, and/or means and/or methods of enhancing the robustness, operation pressures, cycle life, and the like of such membrane contactors, cartridges, components, and systems, apparatus for and/or methods of degassing a high pressure liquid having entrained or dissolved gases with a new or improved hollow fiber membrane contactor, cartridge, shell, component, and/or system, contactors having a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing, microporous hollow fiber membrane devices and/or methods, and/or the like.

In accordance with at least selected embodiments, the present invention is directed to degassing a high pressure liquid having one or more entrained or dissolved gases with a high pressure hollow fiber membrane contactor. Preferably, the contactor has a high pressure vessel or housing enclosing at least one membrane cartridge including a perforated core, a plurality of hollow fiber membranes, a tube sheet affixing each end of the hollow fibers, and a shell or casing, and one or more shims, spacers, protrusions, and/or the like on the shell, on the housing, on the shell and on the housing, and/or between the shell and the housing, and/or the like. More preferably, lumens of the hollow fibers are in fluid communication with a sweep gas (a strip gas), a vacuum, or both, and the liquid to be degassed (or debubbled) enters the contactor via an open end of the perforated core and radially exits through the core perforations, crosses over the exterior of a first portion of the hollow fibers (the shell side or shellside), optionally passes over at least one baffle and crosses over the exterior of another portion of the hollow fibers, returns to the core through the perforations, and exits the contactor with less dissolved or entrained gas. The entrained or dissolved gas diffuses or passes from the liquid across the hollow fiber membrane and into the lumen.

In at least selected embodiments, the present invention is directed to high pressure liquid degassing membrane contactors having high pressure vessels or housings that are typically used in reverse osmosis (RO) equipment (not in liquid degassing membrane contactors). Such RO high pressure vessels or housings may need to be modified or retrofitted to have the permeate or gas ports function correctly under vacuum or reduced pressure conditions. Most RO high pressure vessels or housings have the ports designed to work under pressure but not under vacuum.

In at least certain possibly preferred embodiments, the present invention is directed to degassing a liquid having a dissolved or entrained gas or gases with a membrane contactor including one or more hollow fiber membrane cartridges adapted to fit inside a high pressure vessel or housing. Preferably, the contactor has a high pressure vessel or housing enclosing at least one membrane cartridge including a perforated core, a plurality of hollow fiber membranes, a tube sheet affixing each end of said hollow fibers, an optional baffle, and a shell, and one or more shims, spacers, protrusions, and/or the like on the shell, and/or the like. The hollow fiber lumens are preferably in fluid communication with a sweep gas (or strip gas), a vacuum, or both, and the liquid to be degassed (or debubbled) enters the contactor via an open end of the perforated core and radially exits the core perforations, crosses over the exterior of the membranes within the shell, optionally passes over a baffle and crosses over the exterior of other portions of the membranes within the shell, re-enters the core through other perforations, and exits the contactor with less entrained or dissolved gas. As such, the contactor is a shell-side liquid contactor and the dissolved or entrained gas diffuses from the liquid across the membrane and into the lumen (and out through a side or end gas or vacuum port).

In accordance with at least selected embodiments of the present invention, the new or improved membrane contactors address the drawbacks of prior contactors, are effective for some applications, are adapted for the degassing of high flow rate liquids and/or high pressure liquids, such as seawater at about 50 gpm or more and/or at about 300 psi or more, have high pressure ratings, have ASME code ratings, will have immediate customer familiarity and acceptance, are relatively lower cost, are relatively lower weight, do not use metal or other corrosive materials, do not use PVC, are modular, have replaceable self contained cartridges, offer porting options, have module size, have module array size, have high pressure cartridges, do not have excessively long fibers, accommodate high liquid flow rates, eliminate or reduce gas concentration variations, allow for commercial production, and/or the like.

In accordance with at least certain embodiments of the present invention, a new or improved liquid degassing membrane contactor allows for relatively small, modular, degassing modules to be used in industrial processes, at power plants, on offshore oil rigs or drilling platforms, to replace or augment vacuum towers, to provide the benefits of modularity and replaceable cartridges, and/or the like.

Accordingly, at least certain embodiments of the present invention provide a new or improved liquid degassing membrane contactor which addresses the need for a new or improved liquid degassing membrane contactor and/or methods of manufacture and/or use thereof.

In accordance with at least selected embodiments of the present invention, an improved liquid degassing membrane contactor or module includes a high pressure housing and at least one new or improved degassing cartridge therein. It may be preferred that the high pressure housing is a standard (or retrofitted or modified), ASME certified, reverse osmosis (RO) or water purification high pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 3, 4 or 6 ports, and an end cap at each end) and that the new or improved degassing cartridge is a self-contained, hollow-fiber membrane cartridge adapted to fit in the high pressure housing or vessel.

In at least one particular embodiment, such a new or improved self-contained liquid membrane contactor cartridge may include a perforated center tube, a first mat comprising a plurality of first hollow fiber membranes each having a first end and a second end both being open, an optional baffle separating the hollow fiber mat into two areas, a cartridge shell or casing (such as an elongate cylindrical member) and one or more shims, spacers, protrusions, and/or the like on the shell, and potting at each end. The first and second membrane ends are open, for example, to allow strip or sweep gas to pass there through. It may be preferred that the baffle is formed of a center tube connector joining first and second sections of the center tube and by epoxy that is applied over the center tube connector in the center of the mat or bundle while winding forming a dam or block through the entire thickness of the hollow fiber mat. It may also be preferred that the potting be made of epoxy and that the ends of the potting be cut off to form the open first and second ends following potting.

In accordance with at least one embodiment, the center tube forms an opening in each end of the cartridge and is perforated along its length to provide for liquid to flow through the cartridge and over the hollow fibers. The center tube opening in each end of the cartridge is adapted to be in fluid communication with the respective ports in the end caps of the high pressure housing or vessel. For example, a hollow or tubular adapter or pipe may be used to connect the cartridge openings with the ports in the end caps.

In accordance with at least selected embodiments, the preferred high pressure degassing module includes two or more new or improved cartridges in a single RO high pressure housing. According to at least particular possibly preferred embodiments, the high pressure degassing module includes two or more new or improved cartridges in a single high pressure housing or vessel with a sufficient space between adjacent cartridges to provide an annular area that serves as a mixing chamber or 'Gas Concentration Equalizing Gap' within the length of the lumens in the module. This chamber or gap allows for sweep gasses within the lumens closest to the center tube all the way out to the furthermost diameter to remix and equalize within the length of the module (between cartridges). Doing so allows the driving force of the fibers to increase where their efficiency is the highest (at the center tube) and to decrease where their efficiency is the lowest (at the outermost diameter). The end result may be a significant increase in overall performance as compared to a module without this feature with equivalent membrane area. In one example, the Dissolved Oxygen (DO) removal efficiency of an 8×40 inch module (8"×40" contactor with two membrane cartridges with a gap there between) was significantly better than a conventional degassing module (below 100 gpm) even though the membrane areas were roughly equivalent.

In accordance with at least one embodiment, the preferred RO housing is an 8"×40" or 8"×80" RO housing (such as a corrosion resistant filament-wound fiber reinforced plastic (FRP) pressure vessel) and the membrane cartridges are about 20", 40" or 80" in length.

In accordance with at least one embodiment, an array of two or more 8"×40" or 8"×80" degassing modules is formed of modules having 6 port RO housings connected together.

In accordance with at least selected embodiments of the present invention, an improved liquid degassing membrane contactor or module includes a high pressure housing or vessel and at least one new or improved degassing cartridge therein. It may be preferred that the high pressure housing is a standard (or modified or retrofitted), ASME certified, reverse osmosis (RO) or water purification pressure housing or vessel (made of, for example, polypropylene, polycarbonate, stainless steel, corrosion resistant filament wound fiberglass reinforced epoxy tubing, fiberglass reinforced plastic (FRP), reinforced thermosetting resin pipe (RTRP), and the like) with pressure ratings of, for example, 150, 250, 300, 400, or 600 psi, and with, for example 4 or 6 ports, and an end cap at each end, and that the new or improved degassing cartridge is a self-contained, hollow-fiber membrane cartridge adapted to fit in the RO high pressure housing.

Further, the preferred membrane contactors may offer a modular option for many applications and they can be put in virtually any area of a building. They may rapidly displace forced draft deaerators and vacuum towers in new systems as well as many older ones.

The new or improved membrane contactors preferably use commercially available materials (for example, fiberglass high pressure housing, ABS cartridge shell, polypropylene hollow fibers, epoxy potting), containment vessel and end cap components. The potting material is preferably epoxy, which is used in many other Liqui-Cel® products made by Membrana-Charlotte of Charlotte, N.C. and has been proven in the field for years. Both of the preferred high performance Celgard® X40 and X50 microporous hydrophobic polypropylene hollow fibers are very cost effective for dissolved $CO_2$ and $O_2$ removal from water.

Such preferred devices may be clean enough to be used in the make-up loop of a semiconductor plant. More specifically, they may be used to deoxygenate large make-up systems and to deoxygenate large water streams used in TFT plants. Additionally, they may offer a perfect solution for removing carbon dioxide ($CO_2$) prior to mixed bed or EDI technology to eliminate or reduce chemical usage and improve water quality exiting these technologies. They may also be used in boiler feed water applications for oxygen ($O_2$) removal to protect the boiler and piping from corrosion. In the boiler application, they may also have lower operating costs because blow down frequency is reduced and less energy is required for the contactor system operation.

The preferred changes made to materials, product design, use and replacement allow for more favorable economics of the preferred device for many large industrial and make-up applications. If purity and FDA compliance are important in the end use application, high-purity 8"×40" or 8×80" membrane contactor embodiments are available for those end uses.

In accordance with at least selected possibly preferred embodiments, the present membrane contactors (or membrane cartridges) utilize a plurality of microporous hollow fibers which are bundled, arrayed or wound. For example, the present membrane contactors preferably include one or more membrane cartridges, each having thousands of Celgard® or Membrana microporous polyolefin (PO) hollow fibers, such as hydrophobic polypropylene (PP) or polymethyl pentene (PMP, or poly(4-methyl-1-pentene)) hollow fibers knitted into an array that is wound around a distribution tube with an optional central baffle. During preferred operation, the liquid flows over the shell side or shellside (outside) of the hollow fibers. The preferred design incorporates a baffle in the middle of the hollow fiber bundle in the contactor (or cartridge), which directs the liquid radially across the array. A strip gas or vacuum, either separately or in combination, is applied on the lumen side or lumenside (inside) of the hollow fibers.

Because of its hydrophobic nature, the preferred membrane acts as an inert support to allow direct contact between a gas and liquid phase without dispersion. The dissolved gas in the liquid travels through the pore by applying a higher pressure to the liquid stream relative to the gas stream.

The membrane contactors of the present invention may be used around the world for adding or removing oxygen ($O_2$), carbon dioxide ($CO_2$) and nitrogen ($N_2$) to or from different liquids in the Semiconductor, Power, Pharmaceutical, Photographic, Food and Beverage, and many other industries. Such contactors may also be used to add gasses to liquids to enhance megasonic cleaning. The beverage industry looks to membrane contactors for carbonation, nitrogenation and $O_2$ removal. These reflect only a few examples of the variety of applications where the present membrane contactors may be used.

Additionally, Membrana-Charlotte offers liquid ring vacuum pumps, eductors and Orbisphere sensors to complement such membrane contactors.

At least selected embodiments, methods, systems, and/or objects of the present invention are directed to degassing a liquid with a new or improved membrane contactor and/or cartridge. For example, a liquid having a dissolved gas is introduced into the contactor which is connected to a strip gas and/or vacuum source. The contactor (or one or more cartridges) preferably has a perforated core, a plurality of hollow fiber membranes, a tube sheet affixing each end of the fibers, and a shell having one or more shims, spacers, protrusions, and/or the like on the shell. The core has at least one open end and the hollow fibers have at least one open end to provide gas and liquid openings. The shell encloses the fibers, the tube sheets, and the core. The hollow fiber lumens are in fluid communication with the strip gas and/or vacuum source. As an example, liquid enters the contactor via the core's open end, radially exits the core via perforations, crosses over the exterior of the membranes within the shell, re-enters the core via perforations, and exits the contactor (or cartridge). The dissolved gas thereby diffuses from the liquid across the membranes into the lumens. The degassed or debubbled liquid exiting the contactor or contactor array may have a dissolved gas content (or residual $O_2$) of less than 100 ppb, preferably less than 50 ppb, and more preferably less than 20 ppb. In accordance with at least one possibly preferred embodiment of the invention, a baffle is located between the tube sheets, and the hollow fibers are one of open or closed at the baffle.

In accordance with certain embodiments of the invention, there are provided a novel or improved contactor, contactor array and/or a system for degassing a liquid including one or more such contactors or arrays.

In accordance with at least certain embodiments of the invention, a system for degassing liquids includes a source of liquid containing a gas, a source of vacuum, and at least one contactor having an outer housing or vessel (such as a high pressure housing) and one or more cartridges adapted to be received in the housing and including a perforated core or central opening, a plurality of microporous hollow fibers with tube sheets at each end, one or more optional baffles between the tube sheets, and a shell or casing, and one or more shims, spacers, protrusions, and/or the like on the shell, on the housing, on the shell and on the housing, and/or between the shell and the housing. The source of liquid is preferably in fluid communication with one end of the core or opening. The source of vacuum is preferably in fluid communication with the lumens of the hollow fibers through at least one of the tube sheets. The liquid preferably passes out of the core or opening, across the fibers, around the baffle, across the fibers, and back into the core.

In accordance with at least one object of the invention, there are provided new or improved membrane contactors, cartridges, components (including shells, housings, shims, spacers, and/or the like), systems, their methods of manufacture and/or use, and/or means and/or methods of enhancing the robustness, operation pressures, cycle life, and the like of such membrane contactors, cartridges, components, and systems. In accordance with at least another object of the invention, there are provided new or improved high pressure liquid degassing membrane contactors, cartridges, components, systems, and/or their methods of manufacture and/or use, and/or means and/or methods of enhancing the robustness, operation pressures, cycle life, and the like of such membrane contactors, cartridges, components, and systems.

In accordance with at least yet another object of the invention, there are provided new or improved apparatus for and/or methods of degassing a high pressure liquid having entrained or dissolved gases with a new or improved hollow fiber membrane contactor, cartridge, component, and/or system.

In accordance with at least one particular object of the invention, there are provided new or improved contactors having a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing.

In accordance with at least one possibly preferred object of the invention, there are provided new or improved spiral-type hollow fiber membrane fabric-containing cartridges and modules containing flow-directing baffles, for separations and other phase contact applications.

It is another object of at least selected embodiments of this invention to provide such cartridges and modules in which flow-directing baffles are axially positioned to promote radial flow of fluids throughout the hollow fiber bundle.

It is yet another object of at least certain embodiments this invention to provide such cartridges and modules in which feed fluid flow is directed near to and/or through a portion of the core, and subsequently out to the periphery of the bundle.

It is still another object of at least particular embodiments of this invention to provide a number of cartridge and module designs yielding radial feed fluid flow patterns which can be selected for particular desired membrane contact regimes.

It is an additional object of at least certain embodiments of this invention to provide methods for constructing the improved contactors and/or cartridges.

Further objects and embodiments will be set forth in the discussion below.

At least certain embodiments of the present invention are directed to degassing a liquid such as seawater with a series or parallel array or system of a plurality of new or improved high pressure membrane contactors or cartridges. A liquid having a dissolved gas is introduced into the contactors of the array or system and the contactors are connected to a sweep gas, strip gas, and/or vacuum source. Preferably, each contactor has a high pressure housing or vessel and at least one membrane cartridge including a perforated core, a plurality of hollow fiber membranes, a tube sheet affixing each end of the fibers, and a cylindrical shell. More preferably, each contactor has one or more shims, spacers, protrusions, and/or the like on the shell exterior, on the housing interior, on the shell exterior and on the housing interior, and/or between the shell and the housing. Most preferably, each contactor has one or more shims, spacers, protrusions, and/or the like on the shell exterior and adapted to contact the housing interior when the contactor is under pressure. The shell substantially encloses the fibers, the tube sheets, and the core. More preferably, the hollow fiber lumens are in fluid communication with the sweep gas, strip gas, and/or vacuum source. Liquid preferably enters the contactor via an extension of the core's open end, radially exits the core, crosses over the membranes within the shell, flows around at least one baffle, and exits the contactor via an extension of the core's other open end. The dissolved gas thereby diffuses from the liquid across the membrane into the lumen. The liquid exiting the array or system of a plurality of the high pressure membrane contactors may have a dissolved gas content of less than 10 ppb. The array or system of a plurality of the high pressure membrane contactors is preferably a skid mounted or pallet mounted mobile array of at least three high pressure membrane contactors each having a high pressure housing or vessel and at least one membrane cartridge therein. The preferred array or system has a plurality of high pressure membrane contactors each having an RO high pressure housing or vessel. The preferred array or system has a plurality of high pressure membrane contactors each including at least two membrane cartridges with an optional gas equalizing gap there between.

According to at least selected possibly preferred embodiments of the invention, improvements are provided in a high pressure spiral-type hollow fiber membrane fabric-containing module or contactor, comprising: 1) A high pressure module housing or vessel having an elongate cylindrical central opening; 2) A pair of end caps adapted to fit in or on the ends of said module housing; 3) Liquid end ports in each of said end caps; 4) At least one gas port in at least one of said end caps or in the side of said module housing preferably near one end thereof; 5) At least one membrane cartridge adapted to fit in said elongate cylindrical central opening of said module housing, each membrane cartridge comprising: a. a plurality of hollow fiber membranes each having a lumen and a shell or exterior, said membranes being formed into a fabric-like array in which the hollow fibers substantially are mutually-parallel and preferably constitute the fabric weft, and are held in spaced-apart relationship by filaments constituting the fabric warp; b. the array being wound upon an axis which is substantially parallel to the hollow fibers into a spirally-wound membrane bundle having two bundle ends and a cylindrical exterior surface; c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the cartridge; d. a cartridge shell or casing having first and second shell ends and a cylindrical shell interior and being suitably shaped to contain the membrane bundle, the tube sheet (potting) adjacent the first cartridge shell end sealing the first bundle end to the cylindrical shell interior, said cartridge shell which contains the bundle defining two regions mutually communicating through the membrane including (i) a shell-side space exterior to the portion of the bundle between the tube sheets and within the shell, and (ii) a lumen-side space including the hollow fiber lumens and the first bundle end; 6) Wherein an interior face of a first of said end caps and an interior of said module housing adjacent the first cartridge shell end, together with the first cartridge shell end, an o-ring seal, and the first bundle end, seal a first module housing end and define a first chamber communicating with the membrane lumens; 7) Wherein an interior face of a second of said end caps and an interior of said module housing adjacent a second cartridge shell end, together with the second cartridge shell end, an o-ring seal, and the second bundle end, seal a second module housing end and define a second chamber communicating with the membrane lumens; 8) Said liquid ends ports being operatively connected to the shell-side space of each said membrane cartridge, and arranged to permit fluid injection and withdrawal there through; 9) The at least one gas port communicating with at least one of the first and second chambers, and arranged to permit gas injection and withdrawal there through; and, 10) Wherein each module or contactor has one or more shims, spacers, protrusions, and/or the like on the cartridge shell exterior, on the module housing interior, on the cartridge shell exterior and on the module housing interior, and/or between the shell and the housing. More preferably, each high pressure module or contactor has one or more shims, spacers, protrusions, and/or the like on the cartridge shell exterior and adapted to contact the module housing interior when the module or cartridge is under pressure.

The above improved high pressure spiral-type hollow fiber membrane fabric-containing module or contactor, further comprising: 11) At least two gas ports with one gas port in each of at least each of said end caps or in each side of said module housing near each end thereof.

The above improved high pressure spiral-type hollow fiber membrane fabric-containing module or contactor, further comprising: 12) At least two membrane cartridges adapted to fit in said module housing.

The above improved high pressure spiral-type hollow fiber membrane fabric-containing module or contactor, further comprising: 13) A hollow mandrel in each of said membrane cartridges having a longitudinal axis and a cylindrical exterior surface, an axial bore, and perforations along the surface which communicate with the bore.

The above improved high pressure spiral-type hollow fiber membrane fabric-containing module or contactor, further comprising: 14) Both of the lumen ends of the hollow fibers are exposed and communicate with the exterior of the bundle.

The above improved high pressure spiral-type hollow fiber membrane fabric-containing module or contactor, further comprising: 15) Wherein said module housing is a high pressure vessel or housing such as a RO high pressure vessel.

The above improved high pressure spiral-type hollow fiber membrane fabric-containing module or contactor, further comprising: 16) Wherein the cartridge shell or casing need not support the high pressure as the module housing will prevent the cartridge shell from bursting and if the cartridge shell swells under pressure, the module housing will contain and restrain the cartridge shell.

The above improved high pressure spiral-type hollow fiber membrane fabric-containing module or contactor, further comprising: 17) Wherein the one or more shims, spacers, protrusions, and/or the like on the cartridge shell exterior, on the module housing interior, on the cartridge shell exterior and on the module housing interior, and/or between the shell and the housing preferably shift the peak stress concentration away from the epoxy/shell interface and thereby avoid epoxy delamination at the epoxy/shell interface when high pressure is applied to the module, contactor or cartridge.

The above improved high pressure spiral-type hollow fiber membrane fabric-containing module or contactor, further comprising: 18) Wherein the one or more shims, spacers, protrusions, and/or the like are on the cartridge shell exterior, and contact the module housing interior when high pressure is applied to the module, contactor or cartridge.

The above improved high pressure spiral-type hollow fiber membrane fabric-containing module or contactor, further comprising: 19) Wherein the one or more shims, spacers, protrusions, and/or the like on the cartridge shell exterior contact the module housing interior when the cartridge shell swells under pressure, and the module housing will contain and restrain the cartridge shell.

The above improved high pressure spiral-type hollow fiber membrane fabric-containing module or contactor, further comprising: 20) Wherein the module housing will contain and restrain the cartridge shell should the cartridge shell swell or fail under pressure.

The above improved high pressure spiral-type hollow fiber membrane fabric-containing module or contactor, further comprising: 21) Wherein the module housing and end caps will contain and restrain the membrane cartridge should it fail.

At least selected embodiments of the invention also provide methods for the manufacture and/or use of the above spiral-type hollow fiber membrane fabric-containing modules and/or cartridges.

In accordance with at least selected embodiments of the invention, at least certain objects provide contactors or modules effective for some applications, adapted for the degassing of high flow rate liquids and/or high pressure liquids, such as seawater at about 50 gpm or more and/or about 300 psi or more, having high pressure ratings, having ASME code ratings, having customer familiarity and acceptance, having lower cost, having lower weight, not using metal or other corrosive materials, having modularity, having replaceable self contained cartridges, having porting options, having different module sizes, having different module array sizes, including high pressure cartridges, not having excessively long fibers, having high liquid flow rates, eliminating or reducing gas concentration variation, allowing for commercial production, and/or the like.

In accordance with at least selected embodiments of the invention, at least certain objects provide non-metallic, non-PVC, modular, high flow rate, high pressure membrane contactors that have long been the subject of interest to membrane developers, that can replace or augment large vacuum towers to degasify water, seawater, and the like (for example, at power plants, on offshore oil rigs, or the like to degas water, process water, storage tank water, seawater, salt water, or the like).

In accordance with at least selected embodiments of the invention, at least certain objects provide an improved liquid degassing membrane contactor that allows for relatively small, modular, degassing modules to be used in industrial processes, at power plants, on offshore oil rigs or drilling platforms, to replace or augment vacuum towers, to provide the benefits of modularity and replaceable cartridges, and/or provide an improved liquid degassing membrane contactor, and/or methods of manufacture and/or use thereof, and/or the like.

Further embodiments and/or the various embodiments may be described or detailed in the discussion below, and defined in the appended claims.

BRIEF DESCRIPTION OF THE DRAWINGS

For the purpose of illustrating the embodiments or aspects of the invention, there is shown in the drawings a form that is presently possibly preferred; it being understood, however, that the present invention is not limited to the precise embodiments, aspects, arrangements, and/or instrumentalities shown.

FIG. 4 is a schematic longitudinal cross-sectional illustration of an exemplary module or contactor in accordance with at least certain high pressure embodiments of the present invention taken along line A-A in FIG. 5 (with the side ports pointing downward);

FIG. 4A is a partial enlarged portion of FIG. 4 showing the shim 135, shell 132 and housing 160;

FIG. 5 is an end view of the module of FIG. 4;

FIG. 7 is a schematic longitudinal cross-sectional illustration of the cartridge of FIG. 6 taken along line B-B in FIG. 8;

FIG. 8 is an end view of the cartridge of FIGS. 6 and 7;

DETAILED DESCRIPTION OF THE INVENTION

In accordance with at least one embodiment or aspect of the present invention, it was discovered that certain hollow fiber cartridges for certain high pressure modules or contactors were experiencing epoxy delamination (cartridge failure) due to a high stress concentration at the epoxy/shell interface at one or both ends of the cartridge when high pressure was applied to the contactor or cartridge. This elevated stress concentration was caused by the cartridge shell expanding until it reached the interior surface of the high pressure housing (for example, the gap between the exterior of the cartridge and the interior of the RO vessel was sufficient to allow the cartridge shell to expand outwardly and stress the epoxy/shell interface).

Figure 1:
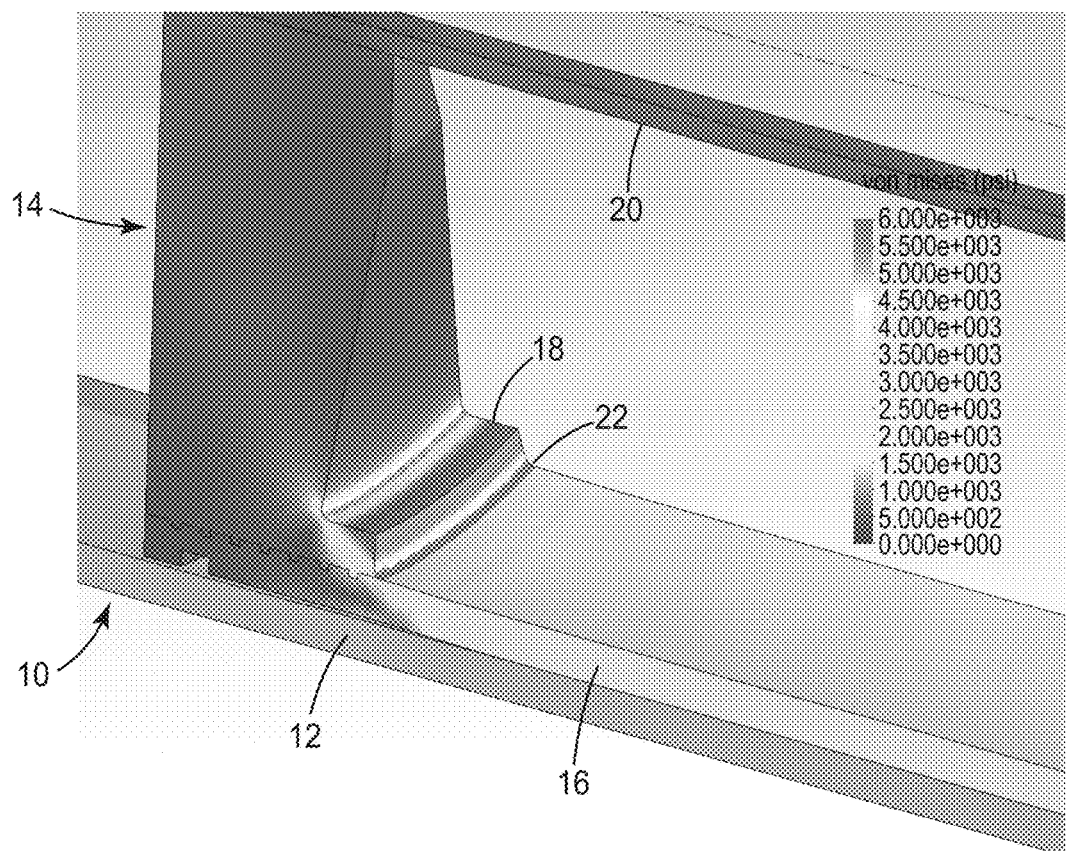
FIG. 1 is a schematic perspective view stress plot or diagram of a portion of a high pressure module including a cartridge and showing the peak stress concentrated at the epoxy/shell interface of the cartridge.

With reference to FIG. 1, a prior high pressure module 10 includes a high pressure outer housing 12 and a cartridge 14 having a shell 16, epoxy or potting 18, hollow fibers (not shown for clarity), and a core 20. Under high pressure, the epoxy/shell interface experiences a high stress concentration 22.

Figure 2:
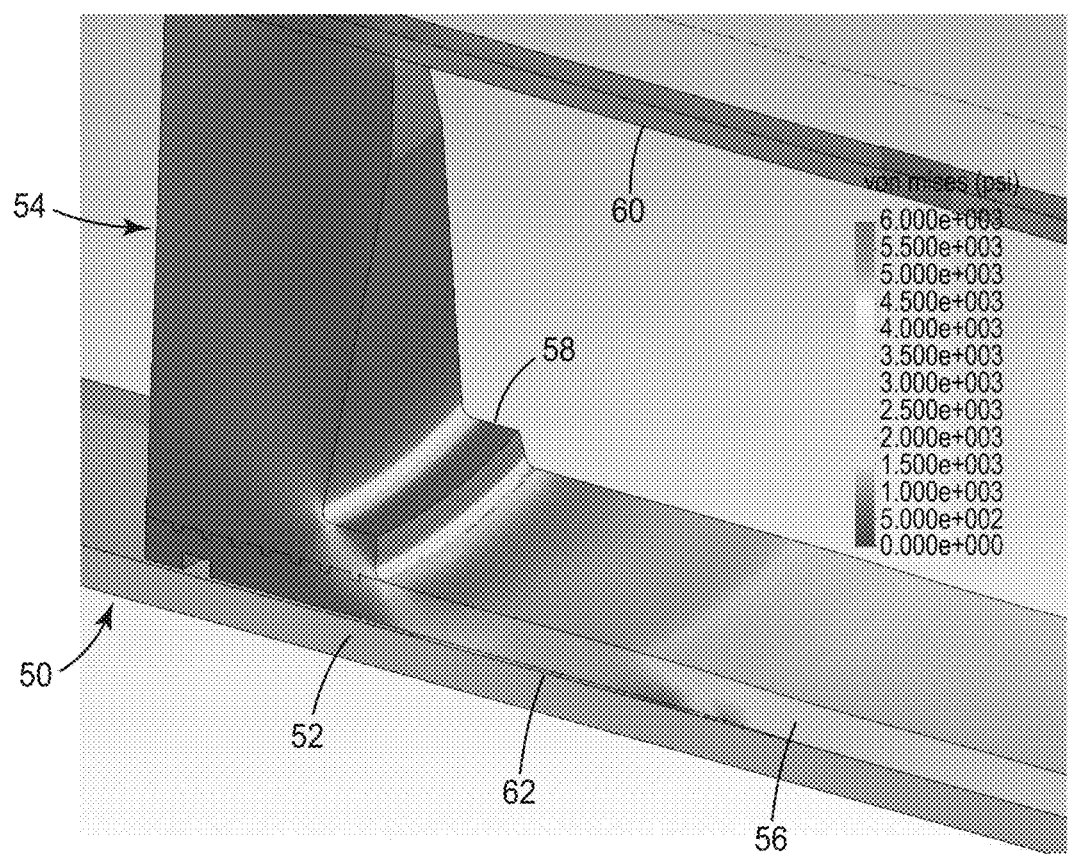
FIG. 2 is a schematic perspective view stress plot or diagram of a portion of a new or improved high pressure module including a cartridge and showing the stress reduced at the epoxy/shell interface and/or shifted away from the epoxy/shell interface in accordance with at least selected embodiments of the present invention.
Figure 3:
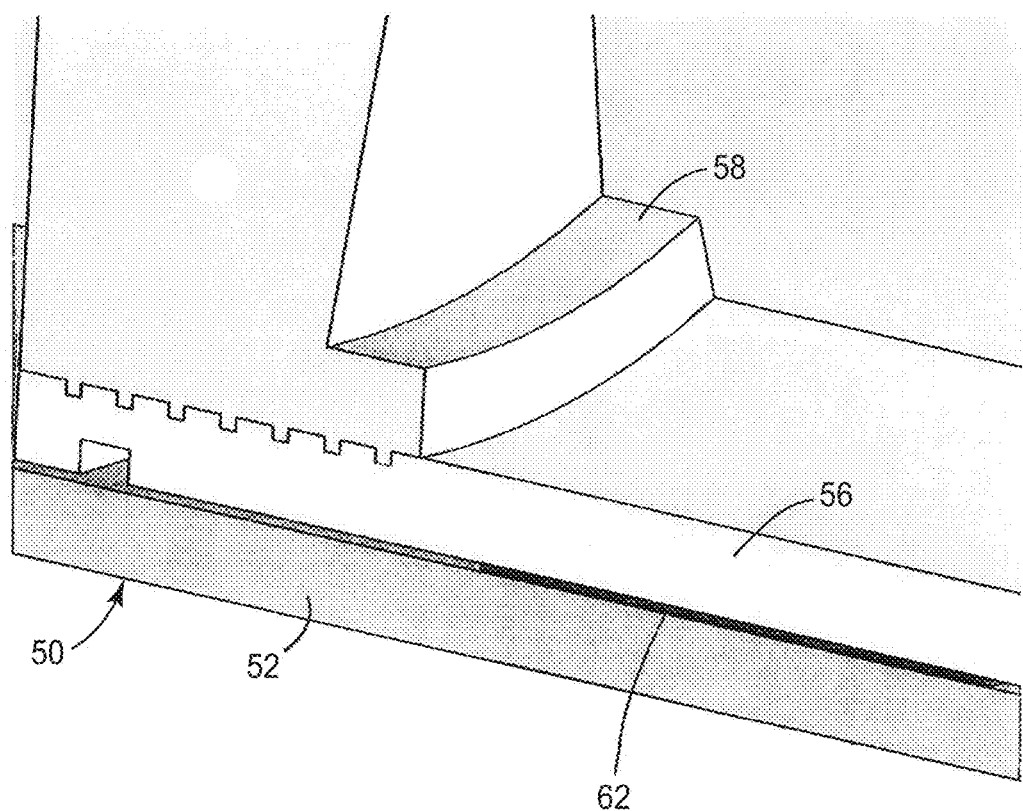
FIG. 3 is a schematic enlarged perspective view illustration of a portion of the inventive module of FIG. 2 showing the shim or spacer between the cartridge and housing.

In accordance with at least another embodiment or aspect of the present invention, it was discovered that by adding a shim, spacer, member, pad, ring, strip, protrusion, or the like to the exterior of the cartridge shell a given distance from the epoxy/shell interface it was possible to shift the peak stress concentration away from the epoxy/shell interface and thereby avoid epoxy delamination (cartridge failure) at the epoxy/shell interface when high pressure was applied to the contactor or cartridge. The cartridge shell is strong enough to support the higher stress in this new location. With reference to FIGS. 2 and 3, a new or improved high pressure module 50 in accordance with at least selected embodiments of the present invention includes a high pressure outer housing 52 and a cartridge 54 having a shell 56, epoxy or potting 58, hollow fibers (not shown for clarity), a core 60, and a shim or spacer 62. Under high pressure, the epoxy/shell interface does not experience as high a stress concentration at the epoxy/shell interface 64. The shim or spacer 62 fills at least a portion of the gap between the exterior of the shell 56 and the interior of the housing 52 and shifts the stress away from the epoxy/shell interface.

In accordance with at least selected embodiments of the present invention, it was discovered that by adding a shim, spacer, ring, strip, or the like to the exterior of the cartridge shell a given distance from the epoxy/shell interface (such as a winding of polyethylene (PE) tape of a given thickness, for example, ~0.005" to 0.1", a given distance from the epoxy/shell interface, for example, ~0.1" to 1.5" from the epoxy/shell interface) it was possible to shift the peak stress concentration away from the epoxy/shell interface and thereby avoid epoxy delamination at the epoxy/shell interface when high pressure was applied to the contactor. The cartridge shell was strong enough to support the higher stress in this new location.

Other shim or spacer options can be used instead of PE tape. For example, other tape materials such as Teflon, Nylon, polypropylene (PP), and other thermoplastics could be used. Also, a thin shim material could be wrapped around the cartridge without the use of tape. Materials such as plastics, metals, or paper could be used. The shims do not need to be a continuous wrap. Shims placed intermittently around the cartridge shell perimeter can also be used. The shims or spacers can be added to the cartridge shell (adhered, glued, welded, or otherwise held in place), can be part of the shell (integral members, machined, cast, molded, or otherwise formed), or both. Further, the shim or spacer can be on the cartridge, on the housing, on both the cartridge and housing, and/or between the cartridge and housing. For at least certain possibly preferred embodiments, it is preferred that the shims or spacers be added to the cartridge shell exterior or formed as part of the cartridge shell (as it may be more difficult, costly or less advantageous to add shims or spacers to the interior of the contactor housing, for ease of manufacturing, for use of off the shelf RO pressure vessels, and/or the like).

Referring to FIGS. 4 to 10 wherein like numerals indicate like elements, there is shown, in FIG. 4, an exemplary module or contactor 100 in accordance with at least certain high pressure embodiments of the present invention such as high pressure liquid degassing membrane contactors. Module 100 includes a pressure housing or vessel 110, end ports 112, 114, end caps 116, 118, end cap locks 120, 122, and side ports 124, 126. Most preferably the module is adapted for liquid degassing, and the end ports 112, 114 are liquid ports to preferably receive liquid to be degassed, debubbled, or the like, and side ports 124, 126 are gas ports to preferably respectively receive and remove sweep gas, strip gas, or the like, and/or for one or both side ports to be connected to vacuum (to be connected to a vacuum source or pump) to facilitate removal or control of the entrained or dissolved gas or gases.

Although it may be less preferred than the above, the module may be adapted for adding one or more gases to the liquid, and the end ports 112, 114 may be liquid ports to receive liquid to be treated or modified, and side ports 124, 126 may be gas ports to respectively receive or remove carbon dioxide, nitrogen, vacuum, and/or the like, or for both side ports to be connected to gas or vacuum (to be connected to a gas or vacuum source or pump) to facilitate control or addition of a gas or gases.

Although it may be still less preferred than above, the module may be adapted for controlling or adding humidity to a gas or air stream, and the end ports 112, 114 may be liquid ports to receive water, and side ports 124, 126 may be gas ports to respectively receive and remove sweep gas, strip gas, air, or the like, and/or for one or both side ports to be connected to vacuum (to be connected to a vacuum source or pump) to facilitate creation, addition, removal, and/or control of water vapor, humidity, or the like.

Although it may be yet less preferred than above, the end ports 112, 114 may be gas ports, and side ports 124, 126 may be liquid ports. Although it may be still yet less preferred, the end ports 112, 114 may be liquid ports, and side ports 124, 126 may be liquid ports, or the end ports 112, 114 may be gas ports, and side ports 124, 126 may be gas ports.

For at least certain applications, the preferred arrangement may be a countercurrent flow of liquid and gas. For example, liquid may flow from port 112 to port 114 while gas flows from port 126 to port 124, or liquid may flow from port 114 to port 112 while gas flows from port 124 to port 126. For at least certain other applications, the preferred arrangement may be a common direction flow of liquid and gas. For example, liquid may flow from port 112 to port 114 while gas flows from port 124 to port 126, or liquid may flow from port 114 to port 112 while gas flows from port 126 to port 124. For at least certain still other applications, the preferred arrangement may be flow of liquid from one liquid port to the other while gas is drawn out of both gas ports. For example, both gas ports 124 and 126 may be connected to vacuum (such as to a vacuum pump). For at least certain yet other applications, the preferred arrangement may be flow of liquid from one liquid port to the other while gas is forced into both gas ports. For example, both gas ports 124 and 126 may be connected to a gas to be introduced into the liquid (such as for carbonation, nitrogenation, or the like).

Many industries have the need to remove, add or control dissolved gasses in liquids. Module or contactor 100 and similar membrane contactors as shown and described herein can be used in such industries where gasses need to be removed, controlled or added. In other words, there are many membrane degassing and gas transfer applications where the present liquid degasifiers could be used.

With reference to FIGS. 4 to 10, module 100 may include one or more cartridges 130. Cartridge 130 preferably includes a cylindrical shell or casing 132, with an interior surface 133 (see FIG. 10), with exterior o-ring grooves 134, 136, and with inventive shims or spacers 135, 137 (see FIGS. 4, 4A, 6, 7, 9, and 10). Further, cartridge 130 includes potting 138, 140 for sealing the ends of the cartridge between the casing interior 133 and the center tube 154, for securing the ends of the hollow fibers, and for forming tube sheets. Potting 138, 140 have respective central end openings 142, 144 preferably defined by the exterior of the center tube 154.

As shown in FIG. 4, module 100 preferably includes cartridge 130 and adapters or connectors 146, 148 each having a raised portion 149, and a first end 150 and second end 152 adapted to mate with or fit in center tube openings 151 and end port openings 153, respectively.

As shown in FIGS. 4 and 7, cartridge 130 also preferably includes center tube 154, baffle 155 and membrane mat 156.

Although the shims or spacers 135, 136 are shown on the shell 132 of cartridge 130, it is understood that the shims, spacers, protrusions, and/or the like may be on the shell, on the housing, on the shell and on the housing, and/or placed between the shell and the housing. The shims serve to help close the gap between the exterior of the shell and the interior of the housing. The shims or spacers may be added to the cartridge, added to the housing, or formed integral with the cartridge and/or the housing. It is preferred that the shim thickness be selected so that there is still a small gap between the shim exterior and housing interior, of, for example, about 0.005", more preferably 0.003", most preferably about 0.001" so that the cartridge can still be inserted into the housing and removed as needed. One benefit of using a tape material to form the shims is that the shims can be customized for any variation in the machining of the particular housing and cartridge.

FIG. 4 shows exemplary module or contactor 100 to be a 4 port module having two end or shell side ports 112, 114 and two side or lumen side ports 124, 126. In accordance with a possibly most preferred embodiment, the housing or vessel 110 has the appearance of and is preferably a standard reverse osmosis (RO) or high pressure water purification type high pressure housing or vessel, with end caps, end cap locks, end ports, and side ports. For example, housing 110 may be a 100 psi, preferably a 300 psi or higher rated, RO or high pressure water purification type housing, such as, for example, an 8"×40", 8"×80", or 16"×80" RO or high pressure water purification housing or vessel, such as a fiberglass or stainless steel vessel. For oil rig or off shore drilling platform degassing applications, it is preferred to use a non-metallic, corrosion resistant, fiberglass type housing.

In accordance with a possibly more preferred embodiment, the module 100 has the appearance of a standard reverse osmosis (RO) or high pressure water purification type high pressure housing or vessel, with end caps, end cap locks, end ports, and side ports, and preferably the seals of the side ports 124, 126 have been modified for reduced pressure gas or vacuum applications. Some standard RO or high pressure water purification type side port seals are only adapted for pressurized liquid applications and may leak when reduced pressure gas or vacuum is applied thereto.

Preferably, housing or vessel 110 of module 100 has an elongated constant diameter central portion 160 and enlarged end portions 162, 164 (see FIG. 4). The openings 166, 168 in the ends 162, 164 of housing 110 may preferably be larger in diameter than the inner diameter of the elongate cylindrical opening 170 (see FIG. 4A) of center section 160 adapted to receive cartridge 130. In accordance with a possibly preferred example, cartridge 130 has an outer diameter slightly smaller than the diameter of the opening 170 and the cartridge is sealed in the opening 170 near its ends by, for example, respective o-rings 172, 174 in grooves 134, 136. As with standard RO housings, end openings 166, 168 are adapted to receive end caps 116, 118 and end cap locks 120, 122 which secure the end caps in position in the housing 110 with the end ports 112, 114 receiving or mating with adapters 146, 148, which places or holds adapters 146, 148 in position and being received by center tube 154. When the end caps are locked in place, then preferably the cartridge, center tube, adapters, and end ports are locked or held in position. The raised portion and a shoulder of adapters 146, 148 limit the maximum that the respective adapter ends can be inserted in the respective end port and center tube openings 151. Adapters 146, 148 preferably also include, for example, o-ring grooves for receiving respective o-rings which form fluid tight seals with the ends of the center tube and inner portions of the end ports.

As described above, the preferred module 100 has a very simple yet very effective construction. The shell side fluid or liquid is separated from the lumen side fluid or gas (except at the membrane interface). Preferably, standard parts such as standard housings, end caps, end ports, side ports, and end cap locks are used together with custom parts such as cartridges, shims, center tubes, and adapters. Depending on the module end use or application, custom end ports, side ports, and/or end caps may need to be used.

Although the center tube 154 may be a single piece perforated pipe (with or without a center plug or flow restrictor), as shown in FIGS. 4 and 7, it is preferred that center tube 154 be made of at least three parts: a first perforated tube portion 190, a second perforated tube portion 192, and a solid tube connector 194. Also, the tube connector 194 preferably has respective threaded ends adapted to mate with internal threads in the ends of tubes 190 and 192 adjacent the connector 194. Also, tube connector 194 preferably has a raised central grooved portion for spacing the tubes 190, 192 and for aiding in forming baffle 155 from, for example, epoxy, as the membrane mat or fabric is wrapped around tube 154, and to help the baffle 155 stay in position after being formed. Similarly, each of tubes 190, 192 may preferably include ribs or grooves near the end opposite connector 194 for aiding in forming potting 138, 140 from, for example, epoxy, after the membrane mat or fabric is wrapped around tube 154 and placed in casing 132, and to help the potting 138, 140 stay in position after being formed. Preferably, each of the tubes 190, 192 has a smooth perforation free inner surface in the end adapted to receive the end of adapters 146, 148.

Membrane mat 156 is preferably separated into two membrane portions 196 and 198 by baffle 155. For example, if liquid to be degassed is flowing through module 100 from end port 112 to end port 114, the liquid flows through opening 113 in end port 112, through the opening in adapter 146, through opening 151 in tube 190, out through perforations or openings 200 in tube 190, around, for example, the hollow fibers in membrane mat portion 196, over baffle 155 (between baffle 155 and casing interior 133), around, for example, the hollow fibers in membrane mat portion 198, through perforations or openings 200 in tube 192, through opening 151 in tube 192, through the opening in adapter 148, and out through opening 115 in end port 114. In this example, tube 190 is a liquid distribution tube and tube 192 is a liquid collection tube.

In another example, the liquid to be degassed is flowing through module 100 from end port 114 to end port 112, the liquid flows through opening 115 in end port 114, through the opening in adapter 148, through opening 151 in tube 192, out through perforations or openings 200 in tube 192, around, for example, the hollow fibers in membrane mat portion 198, over baffle 155 (between baffle 155 and casing interior 133), around, for example, the hollow fibers in membrane mat portion 196, through perforations or openings 200 in tube 190, through opening 151 in tube 190, through the opening in adapter 146, and out through opening 113 in end port 112. In this example, tube 192 is a liquid distribution tube and tube 190 is a liquid collection tube.

Although FIGS. 4 to 10 show a single cartridge 130 in housing 110 of module 100, it is contemplated that two or more cartridges may be used in series in housing 110. Also, although it is preferred to use a one-piece housing 110, one or more sections may be joined to form housing 110.

Although it is preferred to use one or more cartridges having baffled membrane mats therein, it is understood that non-baffled or multiple baffle configurations could be used. For example, membrane mats of short cartridges may be non-baffled, while those of long cartridges may include two or more baffles. Also, it is contemplated that the cartridges may be degassing, RO, NF, and/or UF cartridges.

Figure 11:
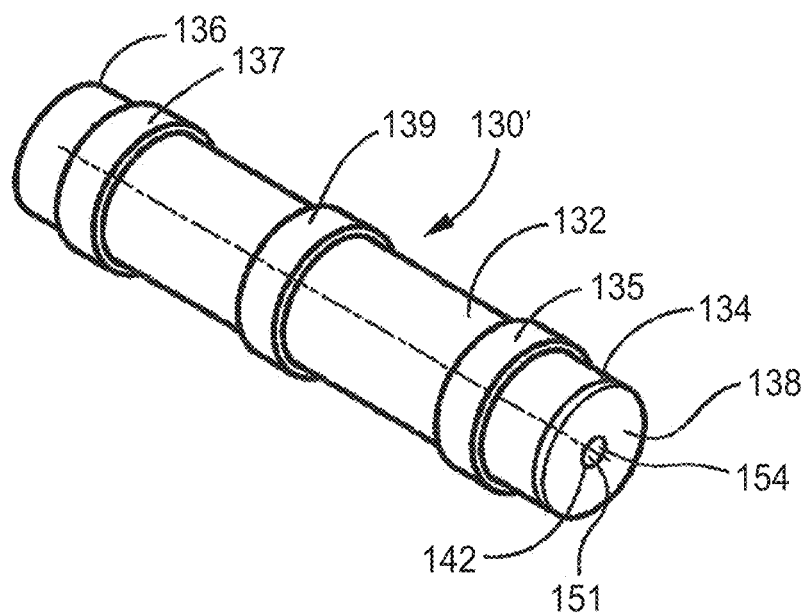
FIG. 11 is a perspective view illustration of an alternative embodiment of a cartridge for the module of FIG. 4.

With reference to FIG. 11, another exemplary cartridge 130' has a third central shim 139.

Figure 12:
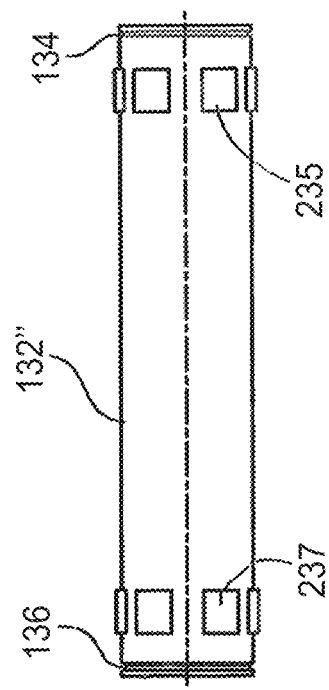
FIGS. 12 and 13 are respective side and end view illustrations of an alternative cartridge shell or casing for the cartridge of FIG. 6; and, FIGS. 14 and 15 are respective side view illustrations of further alternative cartridge shell or casing embodiments for the cartridge of FIG. 6.
Figure 13:
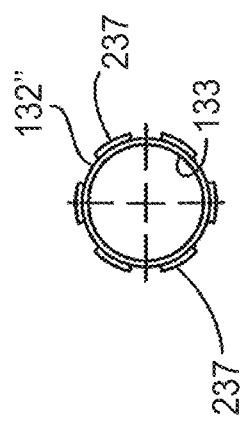

With reference to FIGS. 12 and 13, yet another exemplary cylindrical shell or casing 132" has exterior shim or spacer pieces, pads, or the like 235, 237 spaced around the periphery of the shell 132".

Figure 14:
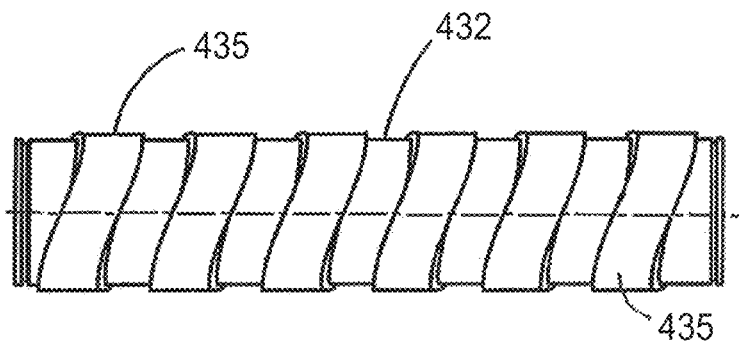

With reference to FIG. 14, still another exemplary cylindrical shell or casing 432 has exterior shim or spacer 435 in the form of a single continuous wrap or spiral along the length of the shell.

Figure 15:
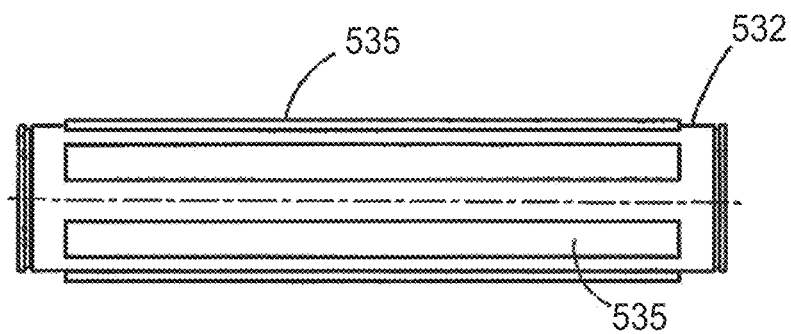

With reference to FIG. 15, still yet another exemplary cylindrical shell or casing 532 has exterior shim or spacer pieces, pads, or strips 535 spaced around the periphery of the shell.

With reference to FIGS. 4, 6, 7 and 11, it is noted that the cartridges are preferably self-contained membrane contactor units, of a reasonable size and weight to be shipped, handled, inserted, and replaced. Such cartridges make it easy to construct and to maintain the modules. In accordance with a possibly preferred example, 8" diameter cartridges are 40" or less in length, and 16" diameter cartridges are 20" or less in length.

Figure 6:
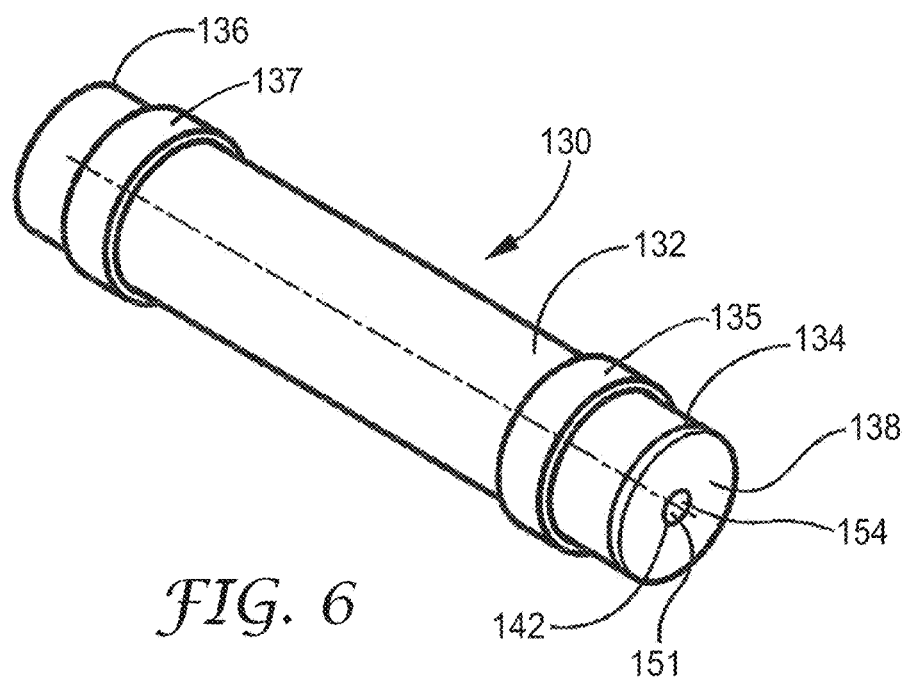
FIG. 6 is a perspective view illustration of the exemplary cartridge from the module of FIGS. 4 and 5.
Figure 9:
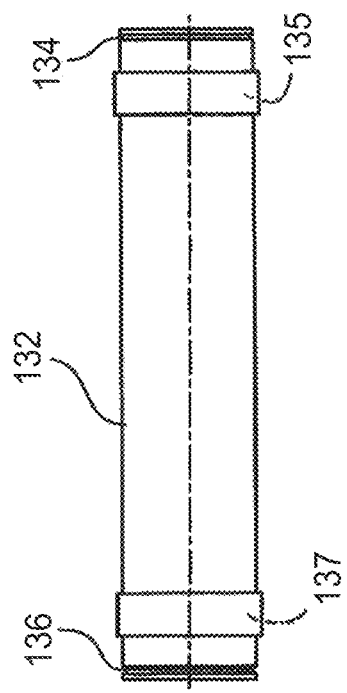
FIGS. 9 and 10 are respective side and end views of the exemplary cartridge shell or casing of FIG. 6.
Figure 10:
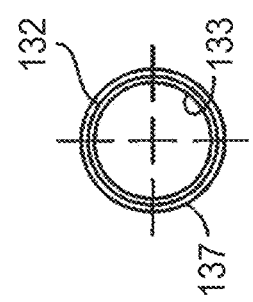

With reference to FIGS. 6 and 9, in one possibly preferred example, cartridge casing or shell 132 has an overall length of about 39.75 inches and an external diameter of about 7.9 inches and is formed of ABS polymer.

In another possibly preferred example, cartridge casing or shell 132 has an overall length of about 79.75 inches and an external diameter of about 7.9 inches.

In yet another possibly preferred example, cartridge casing or shell 132 has an overall length of about 79.75 inches and an external diameter of about 15.9 inches.

With reference to FIGS. 4 and 5, in one possibly preferred example, pressure housing or vessel 110 has an overall length of about 58.25 inches and an internal diameter of about 7.95 inches and is formed of fiberglass, stainless steel, or the like.

In one possibly preferred example, cartridge casing or shell 132 has an overall length of about 19.88 inches and an external diameter of about 7.9 inches and is formed of ABS polymer.

In another possibly preferred example, cartridge housing or shell 132 has an overall length of about 20.28 inches and an external diameter of about 7.9 inches and is formed of ABS polymer.

With reference to FIGS. 4 and 7, in one possibly preferred example, center tube 154 has an overall length of about 21 inches, an external diameter of about 1.3 inches, an internal diameter of about 1 inch and is formed of a polymer.

With reference to FIG. 4, in one possibly preferred example, the adapters or connectors 146, 148 each have a 0.5" diameter center opening providing for fluid flow there through.

When using two or more cartridges, it is preferred to use a cartridge connector that preferably includes a raised center portion adapted to space the adjacent ends (or tube sheets) of adjacent cartridges a small distance apart. In accordance with one example, a connector spaces the cartridges about 0.25 inches apart. This spacing or gap preferably provides for the equalization of the lumen side gas or gasses exiting one cartridge and entering the next cartridge. Such a gap between the open ends of the hollow fibers (the outer edge of the tube sheets) may preferably be from about 0.01 inch to about 2 inches, more preferably about 0.1 inch to about 0.5 inch, and most preferably about 0.15 inch to about 0.35 inch. The connector also preferably includes respective ends adapted to be fit with o-rings and received in the respective open ends 151 of the center tubes of the cartridges, and has a central opening which allows for the flow of shellside liquid from the center tube of one cartridge to the center tube of the other cartridge. This two cartridge configuration may provide a membrane contactor having superior performance over other contactors and configurations.

Multiple modules may be joined in respective parallel or series configurations. For example, three 6 port contactors may have their side ports (gas ports) connected in series by side port couplers adapted to mate with, be received in or be received over the adjacent side ports.

Further, casing 132 may be solid or perforated. Since the cartridge 130 is adapted to be used inside a high pressure housing or vessel, the casing perforations would allow the high pressure liquid to flow out through the openings and between the casing and the interior of the vessel thereby taking at least some of the pressure off the casing. Such perforations may provide for a reduction in the thickness of the casing, the mass of the cartridge, and the like.

Further, perforations through the casing or shell allow liquid pressure to be equal inside and outside the cartridge. As a result, the shell wall does not need to have significant hoop strength. Therefore, it is possible to use a less expensive and thinner shell or tube material, and still retain the basic shell-inside-housing design of the present invention. This structure may provide performing degas systems with less weight and at less cost over conventional systems.

One possibly preferred hollow fiber membrane array includes a plurality of polyolefin hollow fibers, for example, Celgard® X-40 hollow fibers, connected by cross threads spaced along their length, the hollow fibers may have an outer diameter of about 300 um, and an inner diameter of about 200 to 220 um. They may have slit-like micro pores with, for example, an average pore size of 0.03 um. Such hollow fibers may be polypropylene and made by an environmentally friendly dry stretch process.

In accordance with at least one embodiment, a self contained liquid membrane contactor cartridge may include a perforated center tube, a first mat comprising a plurality of first hollow fiber membranes each having a first end and a second end both being open, an optional baffle separating the hollow fiber mat into two areas, a cartridge shell or casing with added shims, and potting at each end. The first and second membrane ends are open, for example, to allow strip or sweep gas to pass there through. It may be preferred that the baffle is formed of a center tube connector joining first and second sections of the center tube and by epoxy that is applied over the center tube connector in the center of the mat or bundle while winding forming a dam or block through the entire thickness of the hollow fiber mat. It may also be preferred that the potting be made of epoxy and that the ends of the potting be cut off to form the open first and second ends following potting.

In accordance with the above embodiment, the center tube forms an opening in each end of the cartridge and is perforated along its length to provide for liquid to flow through the cartridge and over the hollow fibers. The opening in each end of the cartridge is adapted to be in fluid communication with the ports in the end caps of a standard RO housing. For example, a hollow or tubular adapter or pipe may be used to connect the cartridge openings with the ports in the end caps.

In accordance with at least selected embodiments, the improved high pressure degassing module preferably includes two or more shims on the cartridge shell facing the module housing.

It may be preferred that the initial gap between the outer surface of the cartridge shell and the inner surface of the RO pressure housing or vessel be less than 1.0 inch, more preferably less than 0.5 inch, and most preferably less than 0.25 inch, and that the added shims further reduce the gap to less than 0.1 inch, more preferably less than 0.05 inch, and most preferably less than 0.005 inch. The smaller the gap, the less chance that the cartridge shell will fail (crack, come off of the potting) and that it will just bow outwardly until it contacts the RO housing.

Although the particular side port or gas port seal design is not limited, the preferred is a seal design that will work with both positive and negative pressures. Some vessel manufacturers make seal designs that work only with positive pressure as the intended use is for positive pressure RO.

Some of the polymer components may be selected from, for example, polyvinyl chloride (PVC), chlorinated polyvinyl chloride (CPVC), high impact polystyrene (HIPS), polyacrylonitrile-butadiene-styrene (ABS), polyacrylate-styrene-acrlonitrile (ASA), and polycarbonate (PC).

One of the limitations in a conventional, shell-side flow contactor is the length of fibers. Having excessively long fibers causes the lumen side of the fibers to become saturated with the gas one is trying to remove before the sweep gas can exit the opposite end of the fiber. This effect is further exaggerated by the fact that the fibers closest to the center tube, where the velocity is highest, are more efficient than the fibers at the outermost diameter. The end result is that the innermost fibers will have little driving force remaining to remove absorbed gas, while the outermost fibers will still have the capacity to remove gas. The problem is the fibers with the highest driving force are located in the least efficient shell-side flow location.

In accordance with at least one aspect of the present invention, a mixing chamber or 'Gas Concentration Equalizing Gap' is added within the length of the lumens in the module. This gap allows for sweep gasses within the lumens closest to the center tube all the way out to the furthermost diameter to remix and equalize within the length of the module. Doing so allows the driving force of the fibers to increase where their efficiency is the highest (at the center tube) and to decrease where their efficiency is the lowest (at the outermost diameter). The end result is a significant increase in overall performance as compared to a module without this feature with equivalent membrane area. The DO removal efficiency of the present 8×40 inch module with spaced cartridges is significantly better than a conventional contactor (below 100 gpm) even though the membrane areas are roughly equivalent.

In accordance with possible other preferred aspects of the present invention, a hollow-fiber, microporous, hydrophobic, membrane cartridge is inserted into a pressure vessel, the cartridge is self contained and may or may not be capable of withstanding the internal pressure without the aid of an additional support structure, an RO pressure vessel may be the preferred vessel, unlike reverse osmosis a gas and/or vacuum are used on the side ports as opposed to a liquid, once installed, the cartridge wall may be allowed to deflect to the point that it contacts the inside diameter of the pressure vessel, a cartridge clearance with the housing sufficiently loose as to allow for easy installation may be provided, while clearance may be sufficiently tightened in at least particular locations with shims or spacers (such as circumferential or peripheral shims) to provide a support structure for the cartridge shell in at least particular locations to limit deflection due to internal pressure (to avoid epoxy delamination), and/or the like.

In accordance with at least one embodiment of the present invention, it was discovered that by adding a shim, spacer, member, pad, ring, strip, protrusion, member, or the like to the exterior of the cartridge shell a given distance from the epoxy/shell interface (such as a winding of polyethylene (PE) tape of a given thickness, for example, ~0.005" to 0.1", a given distance from the epoxy/shell interface, for example, ~0.1" to 1.5") it was possible to shift the peak stress concentration away from the epoxy/shell interface and thereby avoid the epoxy delamination at the epoxy/shell interface when high pressure was applied to the contactor. The cartridge shell is strong enough to support the higher stress in this new location. A possibly preferred PE tape has a thickness of about 0.005"-0.015" and a width of about 1.5"-3.0". In accordance with a particular example, a possibly preferred shim is formed using a PE tape that is about 2" wide and about 0.0065" thick, and each end of the cartridge shell is wrapped twice (using approximately 50.24" of tape per 8" diameter cartridge shell end).

Other shim or spacer options can be used instead of PE tape. For example, other tape materials such as Teflon, Nylon, polypropylene (PP), and other thermoplastics could be used. Also, a thin shim material could be wrapped around the cartridge without the use of tape. Materials such as plastics, metals, or paper could be used. The shims do not need to be a continuous wrap. Shims placed intermittently around the cartridge shell perimeter can also be used. The shims or spacers can be added to the cartridge shell (adhered, glued, welded, or otherwise held in place), can be part of the shell (integral members, machined, cast, molded, or otherwise formed), or both. Further, the shim or spacer can be on the cartridge, on the housing, on both the cartridge and housing, and/or between the cartridge and housing. For at least certain possibly preferred embodiments, it is preferred that the shims or spacers be added to the cartridge shell exterior or formed as part of the cartridge shell (as it may be more difficult, costly or less advantageous to add shims or spacers to the interior of the contactor housing, for ease of manufacturing, for use of off the shelf RO pressure vessels, and/or the like).

In accordance with at least one particular embodiment of the present invention, it was discovered that the shim is ideally located in a position that is in the same proximity as the point of contact between the shell and housing with no shim.

In accordance with at least selected embodiments of the present invention, the addition of shims, spacers, members, pads, rings, strips, windings, protrusions, members, or the like to the exterior of the cartridge shell a given distance inward from the epoxy/shell interface at least near each end of the cartridge prior to insertion of the cartridge into the contactor housing reduces or eliminates epoxy delamination at the epoxy/shell interface, and/or provides new or improved cartridges, membrane contactors, contactors and systems for the degassing of liquids, liquid degassing membrane contactors, degassing modules, replaceable cartridges, liquid degassing membrane contactors and methods of manufacture and/or use thereof, high pressure liquid degassing membrane contactors and/or methods of manufacture and/or use thereof, high pressure liquid degassing systems, cartridges, shells, components, systems, their methods of manufacture and/or use, and/or means and/or methods of enhancing the robustness, operation pressures, cycle life, and the like of such membrane contactors, cartridges, components, and systems, apparatus for and/or methods of degassing a high pressure liquid having entrained or dissolved gases with a new or improved hollow fiber membrane contactor, cartridge, shell, component, and/or system, contactors having a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing, microporous hollow fiber membrane devices and/or methods, and/or the like.

According to at least one embodiment, the hollow fiber or fibre mats are embedded/potted in a resin by the following method: A staple of hollow fibre mats is introduced into a housing. In a first step, a fugitive or removable liquid or gel is introduced into the housing via the openings while the housing is spinning around its central axis. As a result, the fugitive or removable liquid or gel forms a layer into which the ends of the hollow fibers are embedded. In a second step a liquid hardenable resin is introduced into the housing and by the centrifugal effect forms a resin layer over the first layer of the fugitive or removable liquid or gel, such that the hollow fibres are embedded in the resin layer in a segment along the fibre length nearby the fibre ends. After hardening of the resin, the fugitive or removable liquid or gel is removed and the hollow fibers are embedded in the hardened resin such that the fibers extend with their ends beyond the resin layer, then the fiber ends are trimmed.

In accordance with at least selected embodiments of the present invention, an improved liquid degassing membrane contactor or module includes a high pressure housing and at least one degassing cartridge therein. It may be preferred that the high pressure housing is a standard, ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, and an end cap at each end) and that the degassing cartridge is a self-contained, hollow-fiber membrane cartridge adapted to fit in the RO high pressure housing.

Potting or thermosetting materials include, but are not limited to, epoxy, and polyurethane. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, linear polyethylene, polyurethane prepolymer, polystyrene, polypropylene, and cellulosic and acrylic resins. Exemplary thermoplastics include polyolefins, such as polypropylene and polyethylene.

Different potting methods may be employed to complete the second potting step. Different potting methods, as described hereinabove, include, but are not limited to, mold potting, centrifugal potting, and gravity potting.

The instant application relates to improved membrane contactors, cartridges, shells, components, systems, their methods of manufacture and/or use, and/or means and/or methods of enhancing the robustness, operation pressures, cycle life, and the like of such membrane contactors, cartridges, components, and systems. In at least selected embodiments, the present invention is directed to improved high pressure liquid degassing membrane contactors, cartridges, shells, components, systems, and/or their methods of manufacture and/or use, and/or means and/or methods of enhancing the robustness, operation pressures, cycle life, and the like of such membrane contactors, cartridges, components, and systems. In at least certain embodiments, the present invention is directed to improved apparatus for and/or methods of degassing a high pressure liquid having entrained or dissolved gases with an improved hollow fiber membrane contactor, cartridge, shell, component, and/or system. In at least particular possibly preferred embodiments, the improved contactor has a high pressure vessel or housing enclosing at least one improved membrane cartridge including a perforated core, a plurality of hollow fiber membranes, a tube sheet affixing each end of the hollow fibers, a shell or casing, and one or more shims, spacers, protrusions, and/or the like on the shell, on the housing, and/or between the shell and the housing.

The instant application relates to new or improved membrane contactors, cartridges, components (including shells, housings, shims, spacers, and/or the like), systems, their methods of manufacture and/or use, and/or means and/or methods of enhancing the robustness, operation pressures, cycle life, and the like of such membrane contactors, cartridges, components, and systems. In at least selected embodiments, the present invention is directed to new or improved high pressure liquid degassing membrane contactors, cartridges, components, systems, and/or their methods of manufacture and/or use, and/or means and/or methods of enhancing the robustness, operation pressures, cycle life, and the like of such membrane contactors, cartridges, components, and systems. In at least certain embodiments, the present invention is directed to new or improved apparatus for and/or methods of degassing a high pressure liquid having entrained or dissolved gases with a new or improved hollow fiber membrane contactor, cartridge, component, and/or system. In at least particular possibly preferred embodiments, the new or improved contactor has a high pressure vessel or housing enclosing at least one new or improved membrane cartridge including a perforated core, a plurality of hollow fiber membranes, a tube sheet affixing each end of the hollow fibers, a shell or casing, and one or more shims, spacers, protrusions, and/or the like on the shell, on the housing, on the shell and on the housing, and/or between the shell and the housing.

In accordance with one possibly preferred aspect of the present invention, there is provided a commercially viable high pressure degassing contactor having a high pressure housing or vessel and at least one membrane cartridge therein.

In accordance with another possibly preferred aspect of the present invention, there is provided a commercially viable high pressure degassing contactor having a standard RO high pressure housing or vessel and at least one membrane cartridge therein.

In accordance with yet another possibly preferred aspect of the present invention, there is provided a commercially viable high pressure degassing contactor having a standard RO high pressure housing or vessel and at least two membrane cartridges therein.

In accordance with still yet another possibly preferred aspect of the present invention, it was discovered that a commercially viable, high pressure liquid degassing contactor could be constructed using a standard RO high pressure housing or vessel and at least one membrane cartridge modified by shims or spacers to fit more closely to the vessel.

It is noted that although the baffled membrane design appears to be preferred, there appear to be three design variants for the presently described membrane contactors. The baffled membrane design uses a radial liquid flow path around a central baffle. Liquid flows on the outside (shell side or shellside) of the hollow fibers. The NB, or No Baffle design, does not utilize a central baffle, but it is still a radial flow device. The liquid outlet port on the no baffle design is located in the middle of the device rather than at the contactor ends as in the baffled design. One end of the NB contactor is capped and allows liquid to flow outward or radially across the fibers from a central distribution tube. This variant appears best suited for vacuum operation. The third variant or design allows for liquid flow inside of the hollow fiber (lumen side or lumenside). These devices are not radial flow devices and appear best suited for small flow applications.

When using the Baffled or No-Baffle Membrane Contactors in gas absorption applications such as aeration or carbonation, etc., a gas is introduced into the inside (lumen side) of the hollow fiber membrane and the liquid phase is introduced to the outside (shell side) of the hollow fiber. The partial pressure of the gas and the water temperature controls the amount of gas dissolved in the liquid phase. When using Lumen Side Liquid membrane contactors (non radial flow devices) in this application, the liquid is introduced to the lumen side while the gas is introduced to the shell side.

When using the Baffled or No Baffle Membrane Contactors in gas stripping applications such as decarbonation or deoxygenation, a vacuum or stripping gas or combination of those is applied to the lumen side of the hollow fiber. The liquid stream is introduced to the outside of the fiber. The partial pressure of the gas is decreased to remove dissolved gases from the liquid phase. When using Lumen Side Liquid membrane contactors (non radial flow devices) in this application, the liquid is introduced to the lumen side while the gas/vacuum is applied to the shell side.

In accordance with at least selected embodiments of the present invention, an improved liquid degassing membrane contactor or module includes a high pressure housing and at least one degassing cartridge therein. It may be preferred that the high pressure housing is a standard, ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 2, 3, 4, 5 or 6 ports, and an end cap at each end) and that the degassing cartridge is a self-contained, hollow-fiber membrane cartridge adapted to fit in the RO high pressure housing.

Further, the shims or spacers of the present invention may take at least some of the pressure off the cartridge shell or casing, and may provide for a reduction in the thickness of the casing, the mass of the cartridge, and/or the like.

Further, the shims or spacers of the present invention may take at least some of the pressure off the cartridge shell or casing, and as a result, the shell wall does not need to have significant hoop strength. Therefore, it is possible to use a less expensive and thinner shell or tube material, and still retain the basic shell-inside-housing design of the present invention. This structure may provide performing degas systems with less weight and at less cost over conventional systems.

The present membrane contactor or module may be used for many purposes, including but not limited to, removing entrained gases from liquids, debubbling liquids, filtering liquids, separating fluids, and/or adding a gas to a liquid.

The present invention may be embodied in other forms without departing from the spirit and the essential attributes thereof, and, accordingly, reference should be made to the appended claims, rather than to the foregoing specification, as indicated in the scope of the invention.

The invention claimed is:

1. A degassing module comprising:
    a housing enclosing a cartridge;
    the cartridge comprising a shell having a first end, a second end, and enclosing a plurality of hollow fibers, each of the hollow fibers having an exterior surface and a lumen;
    an end port in fluid communication with the exterior surfaces of the plurality of hollow fibers, and a side port in fluid communication with the lumens of the plurality of hollow fibers;
    the plurality of hollow fibers having a shell/potting interface on the first end and having a shell/potting interface on the second end;
    a first seal comprising an O-ring in a groove between the shell and the housing adjacent the first end and located distally within a length of the shell/potting interface on the first end, and a second seal comprising an O-ring in a groove between the shell and the housing adjacent the second end and located distally within a length of shell/potting interface on the second end; and
    at least one support shim between the housing and the shell, and the at least one support shim positioned between the first seal and the second seal.

2. The degassing module of claim 1 wherein the housing encloses a plurality of the cartridges.

3. The degassing module of claim 1 wherein the housing is a standard reverse osmosis pressure vessel.

4. The degassing module of claim 1 wherein the at least one support shim comprises a first support shim positioned between the first seal and the second seal adjacent the first seal, and a second support shim positioned between the first seal and the second seal adjacent the second seal.

5. The degassing module of claim 4 wherein the first and second support shims comprise rings encircling the shell.

6. The degassing module of claim 4 wherein the at least one support shim comprises a third support shim located between the first support shim and the second support shim.

7. The degassing module of claim 6 wherein the third support shim comprises a third central shim.

8. The degassing module of claim 6 wherein the first support shim, the second support shim, and the third support shim comprise rings encircling the shell.

9. The degassing module of claim 1 wherein the at least one support shim comprises a plurality of shims spaced about the shell.

10. The degassing module of claim 9 wherein the plurality of shims comprise spaced pads located adjacent the first end and spaced pads located adjacent the second end and wherein the spaced pads encircle the shell.

11. The degassing module of claim 9 wherein the plurality of shims comprise spaced pads extending between the first end and the second end and wherein the spaced pads encircle the shell.

12. The degassing module of claim 1 wherein the at least one support shim comprises a spiral wrap.

13. The degassing module of claim 4 wherein the first support shim is located 0.1 to 1.5 inches from the first end and the second support shim is located 0.1 to 1.5 inches from the second end, the first support shim and the second support shim each being 1 to 4 inches wide, and the first support shim and the second support shim are 0.005 to 0.1 inches thick.

14. The degassing module of claim 1 wherein the at least one support shim fills at least a portion of a gap between an exterior of the shell and an interior of the housing.

15. The degassing module of claim 1 wherein the at least one support shim comprises a length of tape wound onto the exterior of the shell in a plurality of turns.

16. The degassing module of claim 15 wherein the tape comprises polyethylene tape.

17. The degassing module of claim 15 wherein the tape comprises a thickness from 0.005 to 0.015 inches and a width from 1.5 to 3.0 inches.

18. The degassing module of claim 1 wherein the at least one support shim is attached to an exterior of the shell.

19. The degassing module of claim 1 wherein the at least one support shim is attached to an interior of the housing.

20. A cartridge for a degassing module comprising:
    a cartridge having a shell with a first end, a second end, an interior surface, and an exterior surface;
    the shell enclosing a plurality of hollow fibers;
    a center tube extending through the plurality of hollow fibers;
    the plurality of hollow fibers having potting securing the ends of the plurality of hollow fibers between the center tube and the interior surface on both the first and the second ends;
    a first exterior O-ring groove on the exterior surface, the first exterior O-ring groove spaced inwardly away from the first end and located distally within a length of the potting on the first end and an O-ring located in the first exterior O-ring groove; and
    a first support shim on the exterior surface, the first support shim spaced inwardly away from the first exterior O-ring groove.

21. The cartridge of claim 20 comprising:
    a second exterior O-ring groove on the exterior surface, the second exterior O-ring groove spaced inwardly away from the second end the potting on the second end and an O-ring located in the first exterior O-ring groove; and a second support shim on the exterior surface, the second support shim spaced inwardly away from the second exterior O-ring groove.

22. The cartridge of claim 21 wherein the first support shim is located 0.1 to 1.5 inches from the first end and the second support shim is located 0.1 to 1.5 inches from the second end, the first support shim and the second support shim each being 1 to 4 inches wide, and the first support shim and the second support shim are 0.005 to 0.1 inches thick.

23. The cartridge of claim 20 wherein the first support shim comprises a length of a strip of material wound in a plurality of turns about the exterior of the shell.

24. The cartridge claim 23 wherein the strip of material comprises a thickness from 0.005 to 0.015 inches and a width from 1.5 to 3.0 inches.

25. The cartridge of claim 20 comprising a housing having a plurality of ports and the housing enclosing the cartridge thereby forming the degassing module.

26. A cartridge for a degassing module comprising:
   a cartridge having a shell with a first end, a second end, an interior surface, and an exterior surface;
   the shell enclosing a plurality of hollow fibers;
   a center tube extending through the plurality of hollow fibers;
   the plurality of hollow fibers having potting securing the ends of the plurality of hollow fibers between the center tube and the interior surface on both the first and the second ends; and
   a first exterior O-ring groove on the exterior surface, the first exterior O-ring groove spaced inwardly away from the first end and located distally within a length of the potting on the first end; and
   a first support shim on the exterior surface, the first support shim comprising a length of a strip of material wound onto the exterior surface in a plurality of turns and the first support shim spaced inwardly away from the first exterior O-ring groove.

27. The cartridge of claim 26 comprising a second exterior O-ring groove spaced inwardly away from the second end and located distally within a length of the potting on the second end; and a second support shim on the exterior surface, and the second support shim comprising a length of a strip of material wound onto the exterior surface in a plurality of turns and the second support shim spaced inwardly away from the second exterior O-ring groove.

28. The cartridge of claim 26 wherein the strip of material is spiraled on the exterior surface.

29. The cartridge of claim 26 wherein the strip of material comprises a tape material.

30. The cartridge of claim 26 comprising a housing having a plurality of ports and the housing enclosing the cartridge thereby forming the degassing module.

31. The cartridge of claim 26 wherein the plurality of turns comprises at least two wraps.

32. The cartridge of claim 26 wherein the first support shim is located a distance from the potting and the distance is 0.1 to 0.5 inches.

33. The cartridge of claim 29 wherein the tape material comprises polyethylene tape having a thickness and the thickness is 0.005 to 0.060 inches.

34. The cartridge of claim 14 wherein there the gap is 0.005 inches or less.

* * * * *

UNITED STATES PATENT AND TRADEMARK OFFICE
CERTIFICATE OF CORRECTION

| | | |
|---|---|---|
| PATENT NO. | : 9,962,629 B2 | Page 1 of 1 |
| APPLICATION NO. | : 13/697799 | |
| DATED | : May 8, 2018 | |
| INVENTOR(S) | : Gareth P. Taylor et al. | |

It is certified that error appears in the above-identified patent and that said Letters Patent is hereby corrected as shown below:

On the Title Page

Column 1, Under (Notice)
Line 3, delete "days. days." and insert -- days. --, therefor.

In the Specification

Column 4
Line 31, delete "degass" and insert -- degas --, therefor.

Column 24
Line 50, delete "acrlonitrile" and insert -- acrylonitrile --, therefor.

In the Claims

Column 31
Line 14, in Claim 24, after "cartridge" insert -- of --.

Signed and Sealed this
Tenth Day of July, 2018

Andrei Iancu
*Director of the United States Patent and Trademark Office*